(12) United States Patent
Sawaragi et al.

(10) Patent No.: US 9,753,447 B2
(45) Date of Patent: Sep. 5, 2017

(54) CONTROL UNIT, OUTPUT CONTROL METHOD AND PROGRAM

(71) Applicant: OMRON CORPORATION, Kyoto (JP)

(72) Inventors: Hiroshi Sawaragi, Shiga (JP); Yutaka Abe, Shiga (JP); Yoshimi Kamitani, Kyoto (JP); Josep Manel Lario Perez, Barcelona (ES)

(73) Assignee: OMRON CORPORATION, Kyoto (JP)

( * ) Notice: Subject to any disclaimer, the term of this patent is extended or adjusted under 35 U.S.C. 154(b) by 314 days.

(21) Appl. No.: 14/561,803

(22) Filed: Dec. 5, 2014

(65) Prior Publication Data

US 2015/0177723 A1 Jun. 25, 2015

(30) Foreign Application Priority Data

Dec. 20, 2013 (EP) .................................... 13382537

(51) Int. Cl.
*G05D 7/00* (2006.01)
*G05B 19/05* (2006.01)
*G05B 19/414* (2006.01)

(52) U.S. Cl.
CPC ....... *G05B 19/056* (2013.01); *G05B 19/4145* (2013.01); *G05B 2219/42189* (2013.01);
(Continued)

(58) Field of Classification Search
CPC ........... G05B 2219/50233; G05B 2219/42189; G05B 15/02; G05B 2219/50234;
(Continued)

(56) References Cited

U.S. PATENT DOCUMENTS 6,442,442 B1 * 8/2002 Weinhofer ......... G05B 19/0426
318/568.1
6,534,944 B2 * 3/2003 Toyozawa .............. G05B 19/19
318/611
(Continued)

FOREIGN PATENT DOCUMENTS

JP 4807475 11/2011
JP 4973792 7/2012

OTHER PUBLICATIONS

"Technical Specification PLCopen-Technical Committee 2—Task Force Function blocks for motion control (Formerly Part 1 and Part 2)", Mar. 17, 2011, pp. 1-141, XP055126657, URL:http://www.plcopen.org/pages/tc2_motion_control/downloads/plcopen_mc_part1_v20.pdf.

(Continued)

*Primary Examiner* — Darrin Dunn
(74) *Attorney, Agent, or Firm* — Greenblum & Bernstein, P.L.C.

(57) ABSTRACT

It is possible to easily change CAM tables, which are used for executing an electronic CAM operation. A CAM computation program performs an electronic CAM operation, using a CAM table that is an array in which displacements of a slave axis of an electronic CAM are associated with phases of a master axis of the electronic CAM. A CAM table generating program receives input of a CAM definition variable that defines an electronic CAM operation to be realized by a motion control, and generates a CAM table in which a CAM curve is stored as an array corresponding to the inputted CAM definition variable. A microprocessor performs a CAM computation program using the CAM table. If the microprocessor receives the input of the CAM definition variable, the microprocessor performs the CAM
(Continued)

table generating program to generate the CAM table, and stores the generated CAM table into the main memory.

10 Claims, 29 Drawing Sheets

(52) U.S. Cl.
CPC .............. *G05B 2219/43174* (2013.01); *G05B 2219/50234* (2013.01)

(58) Field of Classification Search
CPC ........... G05B 2219/42186; G05B 2219/43174; G05B 19/19; G05B 2219/50216; B23Q 16/026; B23Q 5/341; B23Q 5/323
See application file for complete search history.

(56) References Cited

U.S. PATENT DOCUMENTS

| | | | |
|---|---|---|---|
| 8,901,870 B2 | 12/2014 | Yamada et al. | |
| 2003/0090230 A1* | 5/2003 | Fujibayashi | G05B 19/19 318/625 |
| 2003/0103498 A1* | 6/2003 | Oh | H04L 45/00 370/383 |
| 2006/0282181 A1* | 12/2006 | Weinhofer | G05B 19/06 700/83 |
| 2011/0193610 A1* | 8/2011 | Longhurst | G09G 3/20 327/334 |
| 2011/0283061 A1* | 11/2011 | Reddy | G11C 15/00 711/108 |
| 2012/0117462 A1* | 5/2012 | Jacobson | G06F 17/30292 715/249 |
| 2013/0002185 A1 | 1/2013 | Hosomi et al. | |
| 2013/0033218 A1* | 2/2013 | Yamada | G05B 19/06 318/567 |
| 2014/0058565 A1 | 2/2014 | Shimamura et al. | |
| 2014/0088767 A1 | 3/2014 | Shimamura et al. | |

OTHER PUBLICATIONS

European Search Report in European Patent Application No. 13382537.2, mail date is Aug. 4, 2016.

* cited by examiner

519

CAM table No. 1[0].Phase=0.0
CAM table No. 1[0].Phase=0.0
CAM table No. 1[1].Phase=0.1
CAM table No. 1[1].Phase=1.0

⋮

CAM table No. 1[999].Phase=0.0
CAM table No. 1[999].Phase=0.0

FIG. 11

| Index | Phase θ | Displacement δ |
|---|---|---|
| 0 | 0.0 | 0.0 |
| 1 | 0.1 | 0.1 |
| 2 | 0.2 | 5.0 |
| ... | ... | ... |
| k | θa | δ1 |
| ... | ... | ... |
| 3598 | 359.8 | 10.0 |
| 3599 | 359.9 | 5.0 |
| 3600 | 360.0 | 0.0 |
| | 0.0 | 0.0 |
| | 0.0 | 0.0 |
| | .... | .... |
| | 0.0 | 0.0 |

520

Starting point of CAM table (at index 0)
Terminating point of CAM table (at index 3600)
Significant CAM data (number)
Non-significant CAM data
Maximum number of CAM data

FIG. 12

Values of CamTable

| Array number | Phase | Displacement |
|---|---|---|
| ... | | |
| 1799 | (undefined value) | (undefined value) |
| 1800 | (undefined value) | (undefined value) |
| 1801 | (undefined value) | (undefined value) |
| ... | | |
| 1799 | (undefined value) | (undefined value) |
| 1800 | (undefined value) | (undefined value) |
| 1801 | (undefined value) | (undefined value) |
| ... | | |
| 3599 | (undefined value) | (undefined value) |
| 3600 | (undefined value) | (undefined value) |
| 3601 | (undefined value) | (undefined value) |
| ... | | |
| 4000 | (undefined value) | (undefined value) |

Values of CamNodes

| Array number | Master | Slave | Curve | ... | PhasePitch |
|---|---|---|---|---|---|
| 0 | 180.000 | 180.000 | mcStraightLine | - | 0.100 |
| 1 | 360.000 | 0.0 | mcStraightLine | - | 0.100 |
| 2 | 0.000 | - | - | - | - |
| After 3 | - | - | - | - | - |

FIG. 23

Values of CamNodes

| Array number | Master | Slave | Curve | ... | PhasePitch |
|---|---|---|---|---|---|
| 0 | 180.000 | 180.000 | mcStraightLine | - | 0.100 |
| 1 | 360.000 | 0.0 | mcStraightLine | - | 0.100 |
| 2 | 0.000 | - | - | - | - |
| After 3 | - | - | - | - | - |

Values of CamTable

| Array number | Phase | Displacement |
|---|---|---|
| 0 | 0.0 | 0.0 |
| 1 | (undefined value) | (undefined value) |
| ... | | |
| 1799 | (undefined value) | (undefined value) |
| 1800 | (undefined value) | (undefined value) |
| 1801 | (undefined value) | (undefined value) |
| ... | | |
| 1799 | (undefined value) | (undefined value) |
| 1800 | (undefined value) | (undefined value) |
| 1801 | (undefined value) | (undefined value) |
| ... | | |
| 3599 | (undefined value) | (undefined value) |
| 3600 | (undefined value) | (undefined value) |
| 3601 | (undefined value) | (undefined value) |
| ... | | |
| 4000 | (undefined value) | (undefined value) |

FIG. 24

Values of CamNodes

| Array number | Master | Slave | Curve | ... | PhasePitch |
|---|---|---|---|---|---|
| 0 | 180.000 | 180.000 | mcStraightLine | - | 0.100 |
| 1 | 360.000 | 0.0 | mcStraightLine | - | 0.100 |
| 2 | 0.000 | - | - | - | - |
| After 3 | - | - | - | - | - |

Values of CamTable

| Array number | Phase | Displacement |
|---|---|---|
| 0 | 0.0 | 0.0 |
| 1 | 0.1 | 0.1 |
| ... | | |
| 1799 | 179.9 | 179.9 |
| 1800 | 180.0 | 180.0 |
| 1801 | 180.1 | 179.9 |
| ... | | |
| 3599 | 359.9 | 0.1 |
| 3600 | 360.0 | 0.0 |
| 3601 | (undefined value) | (undefined value) |
| ... | | |
| 4000 | (undefined value) | (undefined value) |

FIG. 26

Values of CamNodes

| Array number | Master | Slave | ... | Curve | PhasePitch |
|---|---|---|---|---|---|
| 0 | 180.000 | 180.000 | - | mcStraightLine | 0.100 |
| 1 | 360.000 | 0.0 | - | mcStraightLine | 0.100 |
| 2 | 0.000 | - | - | - | - |
| After 3 | - | - | - | - | - |

Values of CamTable

| Array number | Phase | Displacement |
|---|---|---|
| 0 | 0.0 | 0.0 |
| 1 | 0.1 | 0.1 |
| ... | | |
| 1799 | 179.9 | 179.9 |
| 1800 | 180.0 | 180.0 |
| 1801 | 180.1 | 179.9 |
| ... | | |
| 3599 | 359.9 | 0.1 |
| 3600 | 360.0 | 0.0 |
| 3601 | 0.0 | (undefined value) |
| ... | | |
| 4000 | (undefined value) | (undefined value) |

FIG. 27

Values of CamNodes

| Array number | Master | Slave | Curve | ... | PhasePitch |
|---|---|---|---|---|---|
| 0 | 180.000 | 180.000 | mcStraightLine | - | 0.100 |
| 1 | 360.000 | 0.0 | mcStraightLine | - | 0.100 |
| 2 | 0.000 | - | - | - | - |

Values of CamTable

| Array number | Phase | Displacement |
|---|---|---|
| 0 | 0.0 | 0.0 |
| 1 | 0.1 | 0.1 |
| ... | | |
| 1799 | 179.9 | 179.9 |
| 1800 | 180.0 | 180.0 |
| 1801 | 180.1 | 179.9 |
| ... | | |
| 3599 | 359.9 | 0.1 |
| 3600 | 360.0 | 0.0 |
| 3601 | 0.0 | (undefined value) |
| ... | | |
| 4000 | (undefined value) | (undefined value) |

FIG. 28

Values of CamTable

| Array number | Phase | Displacement |
|---|---|---|
| 0 | 0.0 | 0.0 |
| 1 | 0.1 | 0.1 |
| ... | | |
| 1799 | 179.9 | 179.9 |
| 1800 | 180.0 | 180.0 |
| 1801 | 180.1 | 179.9 |
| ... | | |
| 3599 | 359.9 | 0.1 |
| 3600 | 360.0 | 0.0 |

Values of CamNodes

| Array number | Master | Slave | Curve | ... | PhasePitch |
|---|---|---|---|---|---|
| 0 | 180.000 | 180.000 | mcStraightLine | - | 0.100 |
| 1 | 360.000 | 0.0 | mcStraightLine | - | 0.100 |
| 2 | 0.000 | - | - | - | - |
| After 3 | - | - | - | - | - |

FIG. 29

CONTROL UNIT, OUTPUT CONTROL METHOD AND PROGRAM

TECHNICAL FIELD

The present invention relates to control units, output control methods in the control unit, and programs, and in particular, to a control unit for executing a motion control and a sequence control, an output control method by the control unit, and a program.

BACKGROUND ART

A PLC (Programmable Logic Controller) is, for example, configured by a plurality of units such as a CPU (Central Processing Unit) including a microprocessor for executing a user program, and an IO (Input Output) unit responsible for signal input from external switches and sensors and signal output to external relays and actuators. When the PLC executes a control operation, the data is exchanged among the units for every execution cycle of the user program via a PLC system bus and/or field network.

The control of operations of machineries, facilities, and the like sometimes include a motion control for controlling the motion of a motor. Conventionally, in such motion control, control processing (execution of motion computation program) for periodically outputting a command value to a motor driver, which drives a motor, is typically carried out in a motion controller arranged separate from the PLC.

However, increase in speed of the microprocessor and the communication network is progressing in the field of information technology. Thus, not only the user program, but also the motion computation program can be executed in one microprocessor in the PLC using such techniques.

Below, using a PLC described in Patent Citation 1, a basic configuration and basic function will be described.

The PLC described in Patent Citation 1 includes a configuration of processing a motion control function of controlling a motor and a PLC function of executing a sequence computation (user program) with one CPU. More specifically, the PLC described in Patent Citation 1 includes executing "fixed-cycle motion control processing and each axis processing" and "high speed sequence processing" for every cycle, and furthermore, executing "low speed sequence processing" or "non-fixed cycle motion control processing" in the remaining time of the cycle.

In addition, the PLC in Patent Citation 1 realizes an electronic CAM in the motion control. The electronic CAM realizes the operation of a mechanical CAM in electronic control, so that tooling change of the CAM, fine-tuning of the CAM shape, and the like can be freely and easily carried out.

More specifically, the PLC, using the CAM table, calculates the phase of the master axis for every control cycle and outputs command values corresponding to the displacement of the phase of the slave axis to the motor. The CAM table is a table in which phases of the master axis (one of the position of the encoder for the full closed loop control, the command positions of the servo driver and the virtual servo driver, as well as the feedback positions of the encoder, the servo driver, and the virtual servo driver) and displacements of the slave axis of the electronic CAM are associated with each other.

Furthermore in the electronic CAM technology, with the change of product items and a tooling change, it is desired to make it possible to change the CAM operations. This "change of the CAM operations" includes, not only changing the CAM tables defining the CAM operation, but also correcting or adjusting the CAM operation defined by the CAM table considering the effect of the mechanical error or the like.

According to the PLC described in the Patent Citation 1, the CAM operation is changed by switching the CAM table which is being used for computation. Specifically, a plurality of CAM table are stored in the memory, and the CPU unit switches the CAM table to be used for computation when the instruction about switching the CAM tables due to the change of the one to be controlled.

According to the PLC described in the Patent Citation 2, the CAM operation is changed by rewriting values of the CAM table. Specifically, CPU unit rewrites the values of the CAM table based on the dedicated instruction.

CITATION LIST

Patent Literature

Patent Citation 1: Japanese Patent 4973792
Patent Citation 2: Japanese Patent 4807475

SUMMARY OF THE INVENTION

Problems to be Solved by the Invention

The change of the CAM operations described in the Patent Citation 1 and the Patent Citation 2 include the following problems.

Since the PLC described in the Patent Citation 1 changes the CAM tables by switching the CAM tables which is used for computation, it can not change the CAM table into the CAM tables which have not been stored. Therefore, in order to change the CAM table into the CAM table which has not been stored, it is necessary to connect a dedicated setting tool to the PLC, form a CAM curve defining the CAM operation by using the dedicated tool, and store the CAM table corresponding to the CAM curve into the control device. In other words, in order to change the CAM tables to be used for executing the electronic CAM operation, it is necessary to provide another device and its operation, i.e., it is impossible to change the CAM tables easily.

Since the PLC described in the Patent Citation 2 changes the CAM tables by rewriting the values of the CAM table stored in the PLC based on the dedicated instruction, it is necessary to change each of the values of the CAM table in order to change the CAM curve related to the entire operation. Accordingly, changing works will be increased if the CAM table is to be changed drastically.

Furthermore, since it is the values of the CAM table that is actually changed in order to change the CAM tables in this PLC, it is difficult to confirm how the CAM curve defining the operation has been changed.

In view of the problems described above, it is an object of the invention of the present application to make it possible to change CAM table, which is used for executing an electronic CAM operation.

It is another object of the invention of the present application to make it possible to confirm a CAM curve corresponding to a CAM table which has been changed.

Means for Solving the Problem

According to one aspect of the present invention, a control device is configured to execute a motion control and a sequence control, and includes a processor and a storage unit.

The storage unit is configured to store a CAM computation program and a CAM table. The CAM computation program is configured to execute, using a CAM table that is an array in which displacements of a slave axis of an electronic CAM are each associated with a phase of a master axis of the electronic CAM, a motion control for outputting position instruction values corresponding to the displacements of the slave axis of the electronic CAM associated with the phases of the master axis of the electronic CAM.

The storage unit is configured to further store a CAM table generating program, which is configured to receive input of a CAM definition variable that defines an electronic CAM operation to be realized through the motion control, and to generate a CAM table in which a CAM curve is stored as an array corresponding to the CAM definition variable.

The processor is configured to execute the CAM computation program using the CAM table, and to perform the motion control.

The processor is further configured to receive the input of the CAM definition variable, generate the CAM table by executing the CAM table generating program, and store the generated CAM table into the storage unit.

According to this control device, the processor executes the CAM computation program using the CAM table to perform a motion control outputting the position instruction values corresponding to displacements of the slave axis associated with the phases of the master axis of the electronic CAM. Furthermore, if the CAM definition variable is inputted, the processor generates the CAM table by executing the CAM table generating program.

As described above, since it is the processor of the control device that generates the CAM table, it is not necessary to use a dedicated setting tool for changing the CAM tables. As a result, it becomes easy to change the CAM tables.

The storage unit may be configured to further store a CAM definition variable storing program. The CAM definition variable storing program is configured to store the CAM definition variable and information for identifying the CAM table generated by executing the CAM table generating program into the storage unit, while associating the inputted CAM definition variable with the information for identifying the CAM table.

According to this control device, since the inputted CAM definition variable and the information for identifying the CAM table are associated with each other and stored in the storage unit, it is possible to take out the CAM definition variable corresponding to the currently operating CAM table as necessary to an outside device, and to generate the CAM curve based on the CAM definition variable in the outside device. As a result, it is possible to confirm in the outside device the CAM curve corresponding to the CAM table which has been changed.

One cycle of a task schedule of the motion control may include a fixed-cycle task and a system service. The system service is executed in spare time other than the fixed-cycle task. A timing of the calculation process by the CAM table generating program may be assigned to the fixed-cycle task.

According to this control device, since it is the fixed-cycle task in which the CAM table generating program is executed, it is possible to control the timing of the end of the computation. Accordingly, the control device can precisely conceive the timing when it can execute the CAM computation using the generated CAM table.

One cycle of a task schedule of the motion control may include a fixed-cycle task and a system service. The system service is executed in a spare time other than the fixed-cycle task. A timing of the calculation process by the CAM table generating program may be assigned to the system service.

According to this control device, since it is the system service in which the CAM table generating program is executed, it is possible to execute the CAM table generating program without affecting the fixed-cycle task. This is very advantageous for overcoming the effect of the computation load due to the CAM table generating program against the fixed-cycle task.

According to another aspect of the present invention, a controller system includes the above-described control device, and an input device configured to input data into the control device. The input device is configured to send information that associates the CAM definition variable with information for identifying the CAM table, to the control device.

According to this system, since the information for associating the CAM definition variable with the information for identifying the CAM table is stored in the control device, it is possible to take out the CAM definition variable corresponding to the currently operating CAM table as necessary to the outside device, and to generate the CAM curve based on CAM definition variable in the outside device. As a result, it is possible to confirm in the outside device the CAM curve corresponding to the CAM table which has been changed.

According to another aspect of the present invention, an output control method is employed for the control device configured to execute a motion control and a sequence control. The control device includes a processor and a storage unit.

The output control method includes the steps of:

the processor executing a CAM computation program to execute, using a CAM table that is an array in which displacements of a slave axis of an electronic CAM are each associated with a phase of a master axis of the electronic CAM, a motion control outputting position instruction values corresponding to the displacements of the slave axis of the electronic CAM associated with the phases of the master axis of the electronic CAM;

the processor receiving input of a CAM definition variable that defines an electronic CAM operation to be realized through the motion control, and generating a CAM table in which a CAM curve is arrayed corresponding to the inputted CAM definition variable; and the processor storing a generated CAM table into the storage unit by the processor.

It should be noted that the order of the steps is not limited, and, a plurality of steps may be performed simultaneously or parts of the steps may be overlapped with each other.

According to this output control method, the processor executes the CAM computation program using the CAM table to perform a motion control outputting the position instruction values corresponding to displacements of the slave axis associated with the phases of the master axis of the electronic CAM. Furthermore, if the CAM definition variable is inputted, the processor generates the CAM table by executing the CAM table generating program.

As described above, since it is the processor of the control device that generates the CAM table, it is not necessary to use a dedicated setting tool for changing the CAM tables. As a result, it becomes easy to change the CAM tables.

According to another aspect of the present invention, a program is employed for controlling the control device configured to execute a motion control and a sequence control. The control device includes a processor and a storage unit.

The program causes the processor to perform the steps of:

executing a CAM computation program to execute, using a CAM table that is an array in which displacements of a slave axis of an electronic CAM are each associated with a phase of a master axis of the electronic CAM, a motion control outputting position instruction values corresponding to the displacements of the slave axis of the electronic CAM associated with the phases of the master axis of the electronic CAM;

receiving input of a CAM definition variable that defines an electronic CAM operation to be realized through the motion control, and generate a CAM table in which a CAM curve is arrayed corresponding to the inputted CAM definition variable; and storing a generated CAM table into the storage unit.

It should be noted that the order of the steps is not limited, and a plurality of steps may be performed simultaneously or parts of the steps may be overlapped with each other.

According to this program, the processor executes the CAM computation program using the CAM table to perform a motion control outputting the position instruction values corresponding to the displacements of the slave axis associated with the phases of the master axis of the electronic CAM. Furthermore, if the CAM definition variable is inputted, the processor generates the CAM table by executing the CAM table generating program.

As described above, since it is the processor of the control device that generates the CAM table, it is not necessary to use a dedicated setting tool for changing the CAM tables. As a result, it becomes easy to change the CAM tables.

Effect of the Invention

According to the present invention, in the control unit for executing the electronic CAM, it becomes easy to change the CAM tables for executing the CAM operation.

BRIEF DESCRIPTION OF THE DRAWINGS

FIG. 11 is a view showing a structure array related to the CAM data;

FIG. 12 is a view showing a data structure of a CAM table;

FIG. 23 is a table indicating the value of the CamNodes, and a table indicating values of the CAM table when the CAM table is being generated;

FIG. 24 is a table indicating the value of the CamNodes, and a table indicating values of the CAM table when the CAM table is being generated;

FIG. 26 is a table indicating the value of the CamNodes, and a table indicating values of the CAM table when the CAM table is being generated;

FIG. 27 is a table indicating the value of the CamNodes, and a table indicating values of the CAM table when the CAM table is being generated;

FIG. 28 is a table indicating the value of the CamNodes, and a table indicating values of the CAM table when the CAM table is being generated; and FIG. 29 is a table indicating the value of the CamNodes, and a table indicating values of the CAM table when the CAM table is being generated.

MODE FOR CARRYING OUT THE INVENTION

Figure 1:
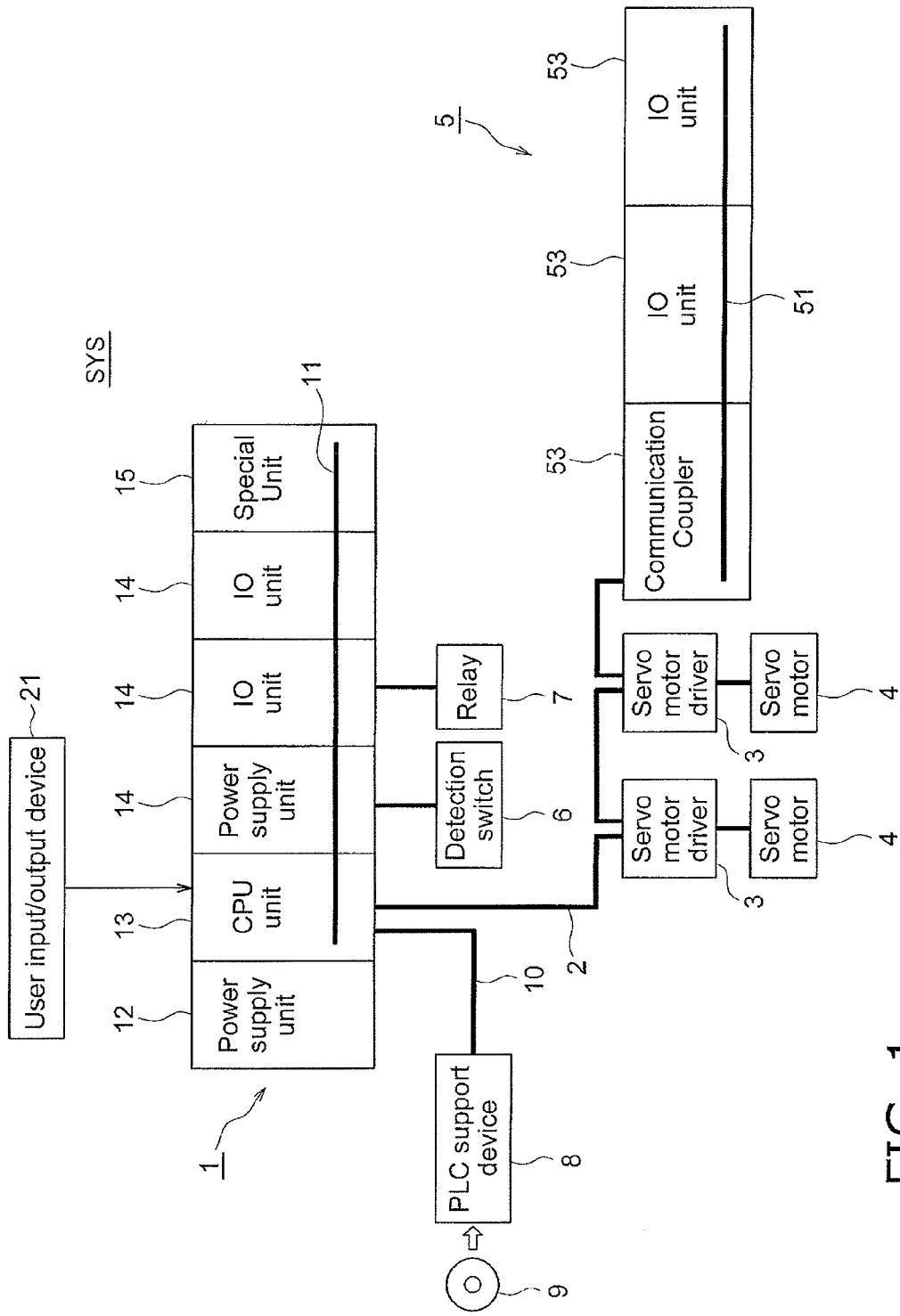
FIG. 1 is a schematic view showing a schematic configuration of a PLC system.

An embodiment of the present invention will be described in detail with reference to the drawings. The same reference numerals are denoted on the same or corresponding portions in the figures, and the description thereof will not be repeated.

A. System Configuration

A PLC according to the present embodiment has a motion control function for controlling the motion of the motor. First, a system configuration of a PLC 1 according to the present embodiment will be described with reference to FIG. 1.

FIG. 1 is a schematic view showing a schematic configuration of a PLC system according to the embodiment of the present invention. With reference to FIG. 1, a PLC system SYS includes the PLC 1, a servo motor driver 3 and a remote IO terminal 5 connected to the PLC 1 by way of a field network 2, and a detection switch 6 and a relay 7, which are field devices. A PLC support device 8 is also connected to the PLC 1 by way of a connection cable 10, and the like.

The PLC 1 includes a CPU unit 13, which executes main computation processing, one or more IO units 14, and a special unit 15. Such units are configured to be able to exchange data with each other through a PLC system bus 11. A power supply of an appropriate voltage is supplied to the units by a power supply unit 12. Each of the units that constitute the PLC 1 is provided by the PLC manufacturing company, and thus the PLC system bus 11 is generally uniquely developed by each PLC manufacturing company and used. As will be described later, the standard and the like of the field network 2, on the other hand, are often publicized so that products from different manufacturing companies can be connected.

Figure 2:
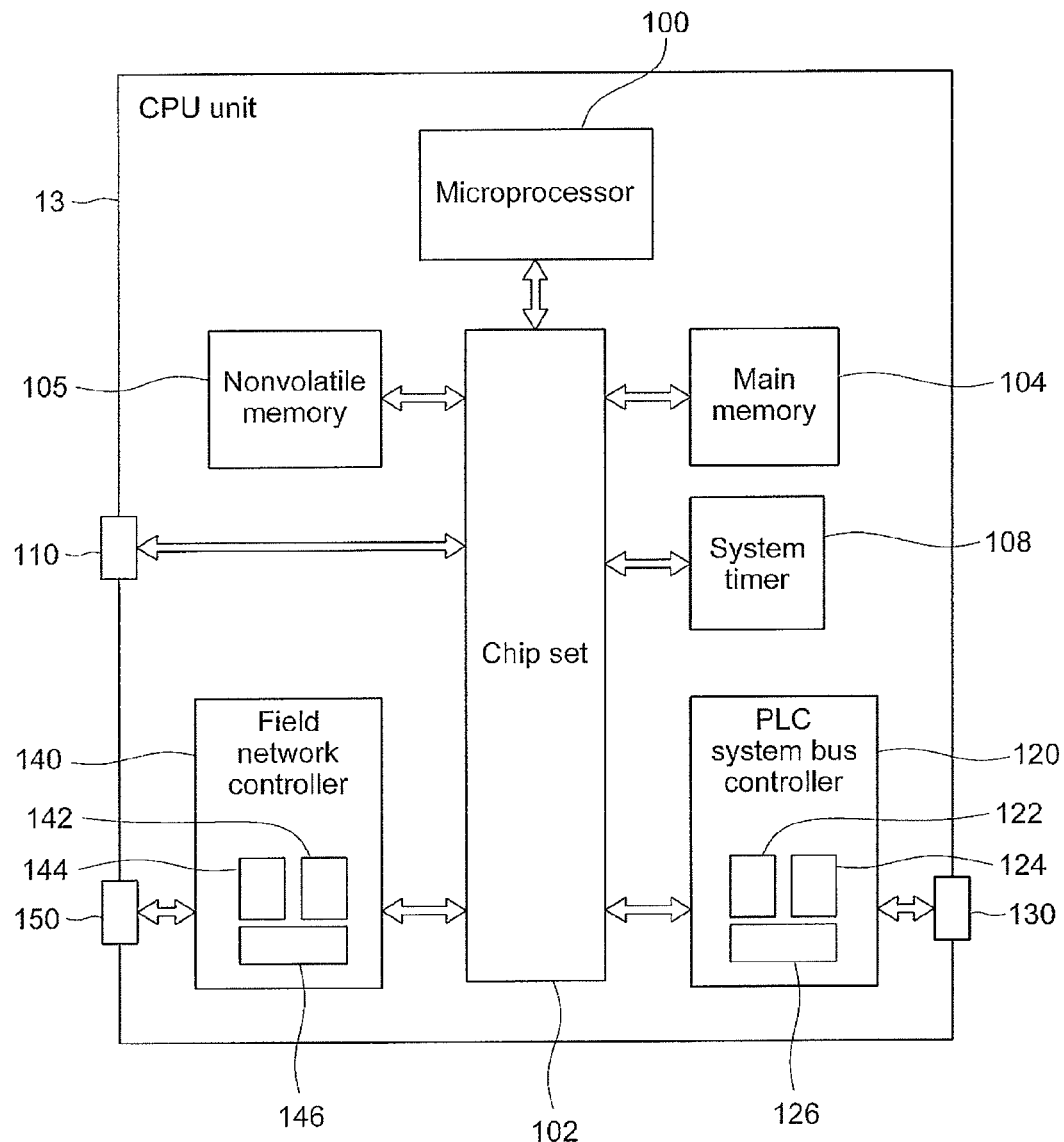
FIG. 2 is a schematic view showing a hardware configuration of a CPU unit.

The details of the CPU unit 13 will be described later with reference to FIG. 2.

The IO unit 14 is a unit associated with general input/output processing, and is responsible for the input/output of binarized data such as ON/OFF. In other words, the IO unit 14 collects information on whether there exists a state (ON) in which a sensor such as the detection switch 6 is detecting some kind of object or a state (OFF) in which the sensor is not detecting any object. The IO unit 14 outputs either a command (ON) for activation or a command (OFF) for deactivation to an output destination such as the relay 7 and the actuator.

The special unit 15 has functions that are not supported by the IO unit 14 such as input/output of analog data, temperature control, and communication by specific communication method.

The field network 2 transmits various types of data exchanged with the CPU unit 13. Various types of industrial Ethernet (registered trademark) can be typically used for the field network 2. For example, EtherCAT (registered trademark), Profinet IRT, MECHATROLINK (registered trademark)-III, Powerlink, SERCOS (registered trademark)-III, CIP Motion, and the like are known as the industrial Ethernet (registered trademark), and any one of the above may be adopted. The field network other than the industrial Ethernet (registered trademark) may also be used. For example, DeviceNet, CompoNet/IP (registered trademark), and the like may be used if the motion control is not carried out. In the PLC system SYS according to the present embodiment, the configuration in which the EtherCAT (registered trademark), which is the industrial Ethernet (registered trademark), is adopted as the field network 2 will be typically illustrated in the present embodiment.

In FIG. 1, the PLC system SYS including both the PLC system bus 11 and the field network 2 is illustrated, but a system configuration mounted with only one of the PLC system bus 11 or the field network 2 may be adopted. For example, all the units may be connected with the field network 2. Alternatively, the field network 2 may not be used, and the servo motor driver 3 may be directly connected to the PLC system bus 11. Furthermore, communication unit for the field network 2 may be connected to the PLC system bus 11, and communication with the apparatus connected to the field network 2 from the CPU unit 13 may be carried out through such communication unit.

The servo motor driver 3 is connected to the CPU unit 13 through the field network 2, and drives a servo motor 4 according to a command value from the CPU unit 13. More specifically, the servo motor driver 3 receives command values such as position instruction value, speed command value, and torque command value in a constant cycle from the PLC 1. The servo motor driver 3 also acquires an actual measurement value related to the operation of the servo motor 4 such as position, speed (typically calculated from the difference of current position and previous position), and torque from a detector such as a position sensor (rotary encoder) and a torque sensor connected to the axis of the servo motor 4. The servo motor driver 3 then sets the command value from the CPU unit 13 as a target value, and performs the feedback control with the actual measurement value as a feedback value. In other words, the servo motor driver 3 adjusts the current for driving the servo motor 4 so that the actual measurement value approaches the target value.

The servo motor driver 3 is sometimes referred to as a servo motor amplifier.

FIG. 1 shows a system example in which the servo motor 4 and the servo motor driver 3 are arranged as a group, but other configurations, for example, a system in which a pulse motor and a pulse motor driver are arranged as a group may be adopted.

The remote IO terminal 5 is also connected to the field network 2 of the PLC system SYS shown in FIG. 1. The remote IO terminal 5 basically performs processing associated with the general input/output processing, similar to the IO unit 14. More specifically, the remote IO terminal 5 includes a communication coupler 52 for performing processing associated with data transmission on the field network 2, and one or more IO units 53. Such units are configured to be able to exchange data with each other through a remote IO terminal bus 51.

The PLC support device 8 will be described later.

B. Hardware Configuration of CPU Unit

The hardware configuration of the CPU unit 13 will now be described with reference to FIG. 2. FIG. 2 is a schematic view showing a hardware configuration of the CPU unit 13 according to the embodiment of the present invention. With reference to FIG. 2, the CPU unit 13 includes a microprocessor 100, a chip set 102, a main memory 104, a non-volatile memory 106, a system timer 108, a PLC system bus controller 120, a field network controller 140, and a USB connector 110. The chip set 102 and the other components are respectively connected through various buses.

The microprocessor 100 and the chip set 102 are typically configured according to versatile computer architecture. In other words, the microprocessor 100 interprets and executes an instruction code sequentially provided according to an internal clock from the chip set 102. The chip set 102 exchanges internal data with various components connected thereto and also generates the instruction code necessary for the microprocessor 100. Furthermore, the chip set 102 has a function of caching data and the like obtained as a result of executing the computation processing in the microprocessor 100.

The CPU unit 13 includes the main memory 104 and the non-volatile memory 106 as storage units.

The main memory 104 is a volatile storage region (RAM) and holds various types of programs to be executed by the microprocessor 100 after turning ON the CPU unit 13. The main memory 104 is also used as a work memory when the microprocessor 100 executes various types of programs. Devices such as DRAM (Dynamic Random Access Memory) and SRAM (Static Random Access Memory) are used for the main memory 104.

The non-volatile memory 106 holds, in a non-volatile manner, data such as real time OS (Operating System), system program of the PLC 1, user program, motion computation program, and data such as system setting parameter. Such programs and data are copied onto the main memory 104, as necessary, so as to be accessible by the microprocessor 100. A semiconductor memory such as a flash memory can be used for the non-volatile memory 106. Alternatively, a magnetic recording medium such as a hard disc drive, an optical recording medium such as a DVD-RAM (Digital Versatile Disk Random Access Memory), and the like can also be used.

The system timer 108 generates an interrupt signal in every constant cycle and provides the same to the microprocessor 100. The interrupt signal is typically generated in a plurality of different cycles depending on the specification of the hardware, but the interrupt signal may be set to be generated in an arbitrary cycle by the OS (Operating System), BIOS (Basic Input Output System), and the like. The control operation for every motion control cycle, as will be described later, is realized using the interrupt signal generated by the system timer 108.

The CPU unit 13 includes the PLC system bus controller 120 and the field network controller 140 as communication circuits.

A buffer memory 126 functions as a transmission buffer of the data (hereinafter also referred to as "output data") output to another unit through the PLC system bus 11, and as a reception buffer of the data (hereinafter also referred to as "input data") input from another unit through the PLC system bus 11. The output data created by the computation processing of the microprocessor 100 is originally stored in the main memory 104. The output data to be transferred to a specific unit is read out from the main memory 104, and temporarily held in the buffer memory 126. The input data transferred from another unit is temporarily held in the buffer memory 126, and then transferred to the main memory 104.

A DMA control circuit 122 performs transfer of the output data from the main memory 104 to the buffer memory 126, and transfer of the input data from the buffer memory 126 to the main memory 104.

A PLC system bus control circuit 124 performs processing of transmitting the output data in the buffer memory 126 and processing of receiving the input data and storing the input data into the buffer memory 126 with another unit connected to the PLC system bus 11. The PLC system bus control circuit 124 typically provides functions of the physical layer and the data link layer in the PLC system bus 11. A connector 130 is an interface between the PLC system bus control circuit 124 and an outside device.

The field network controller 140 controls the exchange of data through the field network 2. In other words, the field network controller 140 controls the transmission of the output data and the reception of the input data according to the standard of the field network 2 being used. As described above, the field network 2 complying with the EtherCAT (registered trademark) standard is adopted in the present embodiment, and hence the field network controller 140 including hardware for carrying out the normal Ethernet (registered trademark) communication is used. In the EtherCAT (registered trademark) standard, a general Ethernet (registered trademark) controller that realizes the communication protocol complying with the normal Ethernet (registered trademark) standard can be used. However, the Ethernet (registered trademark) controller of a special specification corresponding to the communication protocol of a dedicated specification different from the normal communication protocol is used depending on the type of industrial Ethernet (registered trademark) adopted for the field network 2. Furthermore, if the field network other than the industrial Ethernet (registered trademark) is adopted, a dedicated field network controller corresponding to such standard is used.

A DMA control circuit 142 performs transfer of the output data from the main memory 104 to a buffer memory 146, and transfer of the input data from the buffer memory 146 to the main memory 104.

A field network control circuit 144 performs processing of transmitting the output data in the buffer memory 146 and processing of receiving the input data and storing the input data into the buffer memory 146 with another device connected to the field network 2. The field network control circuit 144 typically provides functions of the physical layer and the data link layer in the field network 2. A connector 150 is an interface between the field network controller 140 and an outside circuit.

The USB connector 110 is an interface for connecting the PLC support device 8 and the CPU unit 13. Typically, the programs and the like transferred from the PLC support device 8 and executable by the microprocessor 100 of the CPU unit 13 are retrieved to the PLC 1 through the USB connector 110.

C. Software Configuration of CPU Unit

The software group for providing various functions according to the present embodiment will now be described with reference to FIG. 3. The instruction code contained in the software is read out at an appropriate timing, and executed by the microprocessor 100 of the CPU unit 13.

Figure 3:
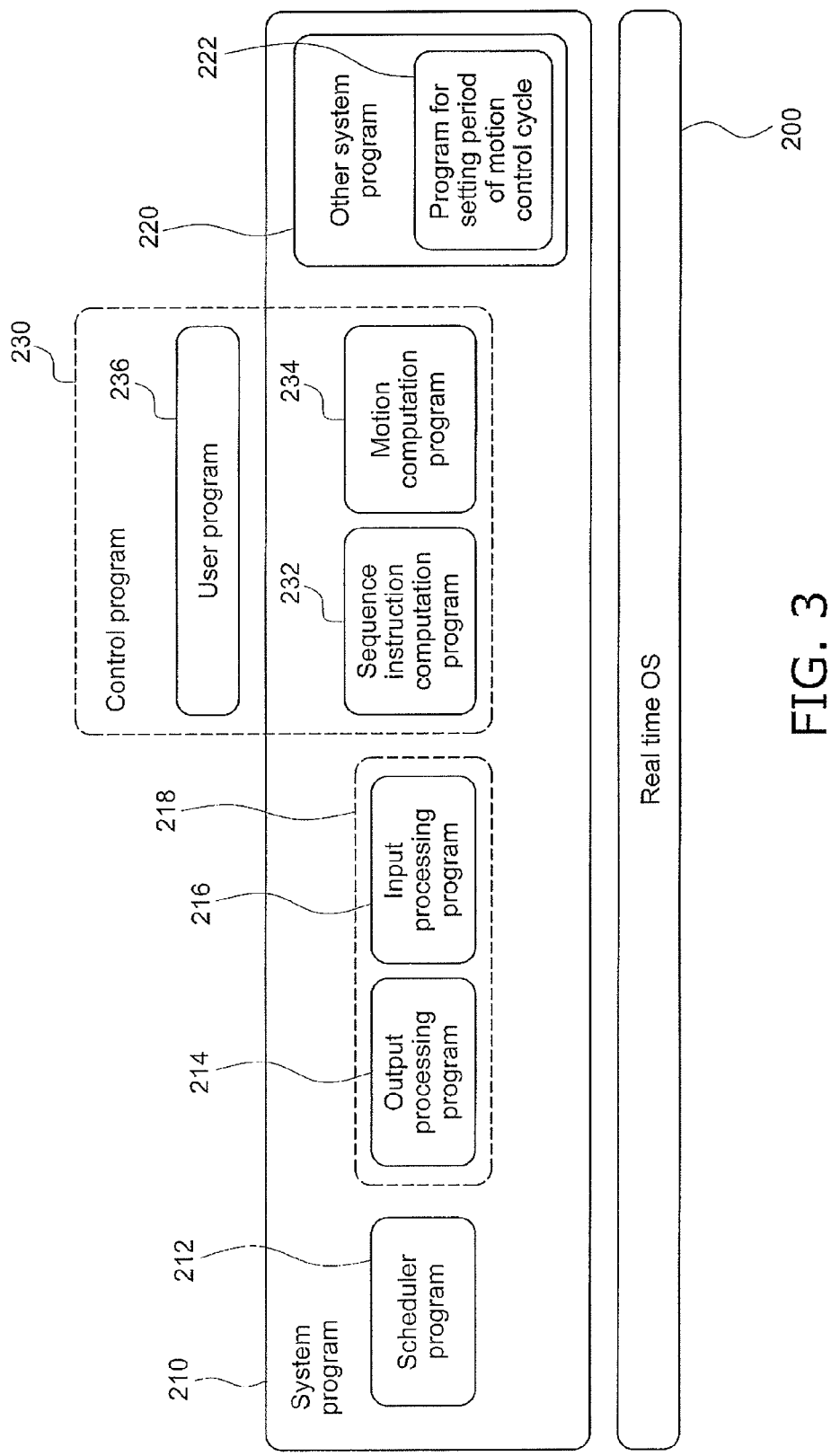
FIG. 3 is a schematic view showing a software configuration executed by the CPU unit.

FIG. 3 is a schematic view showing a software configuration executed by the CPU unit 13 according to the embodiment of the present invention. With reference to FIG. 3, the software executed by the CPU unit 13 has three hierarchies, a real time OS 200, a system program 210, and a user program 236.

The real time OS 200 is designed according to the computer architecture of the CPU unit 13, and provides the basic execution environment for the microprocessor 100 to execute the system program 210 and the user program 236. The real time OS is typically provided by the manufacturing company of the PLC, the specialized software company, and the like.

The system program 210 is constituted by a plurality of software programs for providing the functions of the PLC 1. Specifically, the system program 210 includes a scheduler program 212, an output processing program 214, an input processing program 216, a sequence instruction computation program 232, a motion computation program 234, and other system program 220. Generally, the output processing program 214 and the input processing program 216 are successively (integrated manner) executed, and thus the output processing program and the input processing program are sometimes collectively referred to as an IO processing program 218.

The user program 236 is created according to the control purpose of the user. In other words, the user program 236 is a program arbitrarily designed according to a target line (process), and the like to be controlled using the PLC system SYS.

As will be hereinafter described, the user program 236 cooperatively operates with the sequence instruction computation program 232 and the motion computation program 234 to realize the control purpose of the user. In other words, the user program 236 uses instructions, functions, function modules, and the like provided by the sequence instruction computation program 232 and the motion computation program 234 to realize a programmed operation. Thus, the user program 236, the sequence instruction computation program 232, and the motion computation program 234 are sometimes collectively referred to as a control program 230.

The microprocessor 100 of the CPU unit 13 executes the system program 210 and the user program 236 stored in the storage unit in the above manner.

Hereinafter, each program will be more specifically described.

As described above, the user program 236 is created according to the control purpose (e.g., target line and process) of the user. The user program 236 is typically in an object program format executable by the microprocessor 100 of the CPU unit 13. The user program 236 is generated when source programs described by the ladder language and the like are compiled in the PLC support device 8, and the like. The generated user program 236 in the object program format is transferred from the PLC support device 8 to the CPU unit 13 through the connection cable 10, and stored in the non-volatile memory 106, and the like.

The scheduler program 212 controls the start of the processing and the resuming of the processing after the processing is interrupted in each execution cycle for the output processing program 214, the input processing program 216, and the control program 230. More specifically, the scheduler program 212 controls the execution of the user program 236 and the motion computation program 234.

In the CPU unit 13 according to the present embodiment, the execution cycle (motion control cycle) of a constant period suited for the motion computation program 234 is adopted as a common cycle for the entire processing. It is thus difficult to complete all processing within one motion control cycle. Hence, the process having a high priority is executed and completed in each of the motor control cycles, and the process having a low priority is executed over a plurality of the motion control cycles. The scheduler program 212 manages the execution order and the like of the divided processing. More specifically, the scheduler program 212 executes the program with higher priority first within each motion control cycle period.

The output processing program 214 rearranges the output data generated by the execution of the user program 236 (control program 230) to a format suited for transfer to the PLC system bus controller 120 and/or the field network controller 140. If the PLC system bus controller 120 or the field network controller 140 requires an instruction to execute the transmission from the microprocessor 100, the output processing program 214 issues such instruction.

The input processing program 216 rearranges the input data received through the PLC system bus controller 120 and/or the field network controller 140 to a format suited for use by the control program 230.

The sequence instruction computation program 232 is a program that is called out when a certain type of sequence instruction used in the user program 236 is executed, and is executed to realize the content of such instruction.

The motion computation program 234 is a program executed according to the instruction from the user program 236, and calculates a command value to output to a motor driver such as the servo motor driver 3 or a pulse motor driver.

Other system program 220 collectively indicates the program group for realizing various types of functions of the PLC 1 other than the programs individually shown in FIG. 3. The other system program 220 includes a program 222 for setting the period of the motion control cycle.

The period of the motion control cycle can be appropriately set according to the control purpose. Typically, the user inputs the information specifying the period of the motion control cycle to the PLC support device 8. The input information is then transferred from the PLC support device 8 to the CPU unit 13. The program 222 for setting the period of the motion control cycle stores the information from the PLC support device 8 into the non-volatile memory 106, and the program 222 is configured such that the system timer 108 generates the interrupt signal in the specified period of motion control cycle. When the program 222 for setting the period of the motion control cycle is executed at the time of turning ON the CPU unit 13, the information specifying the period of the motion control cycle is read out from the non-volatile memory 106, and the system timer 108 is set according to the read information.

A value of time indicating the period of the motion control cycle, information (number or character) that specifies one of a plurality of options prepared in advance related to the period of the motion control cycle, and the like, may be adopted for the format of the information specifying the period of the motion control cycle.

In the CPU unit 13 according to the present invention, the period of the motion control cycle is arbitrarily set, using a communication unit with the PLC support device 8 used to acquire the information specifying the period of the motion control cycle, the program 222 for setting the period of the motion control cycle, and a configuration of the system timer 108 configured to be able to arbitrarily set the period of the interrupt signal defining the motion control cycle.

The real time OS 200 provides an environment for switching a plurality of programs with elapse of time and executing the relevant program. In the PLC 1 of the present embodiment, an output preparation interruption (P) and a field network transmission interruption (X) are initially set as an event (interruption) for outputting (transmitting) the output data generated by the program execution of the CPU unit 13 to other units or other devices. When the output preparation interruption (P) or the field network transmission interruption (X) occurs, the real time OS 200 switches the executing target in the microprocessor 100 from the program being executed at the time the interruption occurred to the scheduler program 212. The real time OS 200 executes the program included in the other system program 210 if the scheduler program 212 and the program which execution is controlled by the scheduler program 212 are not executed at all. Such program includes a program related to the communication processing through the connection cable 10 (USB) and the like between the CPU unit 13 and the PLC support device 8.

D. Outline of Motion Control

A typical configuration contained in the user program 236 described above will now be described. The user program 236 includes an instruction to periodically determine whether or not a condition to start the control related to the motion of the motor is met. For example, the logic is to determine whether or not a work to be subjected to some kind of procedure by the drive force of the motor has been transported to a predetermined processing position. The user program 236 further includes an instruction to start the motion control in accordance with the determination that the condition to start the control is met. The execution of the motion instruction is instructed with the start of the motion control. The motion computation program 234 corresponding to the instructed motion instruction is activated, and the initial processing necessary to calculate the command value with respect to the motor is first executed for every execution of the motion computation program 234. In the motion control cycle same as that of the initial processing, the command value in the first cycle is calculated. Therefore, the initial processing and the first command value calculation processing become the processing to be performed by the activated motion computation program 234 in the first execution. Thereafter, the command value in each cycle is sequentially calculated.

Figure 4:
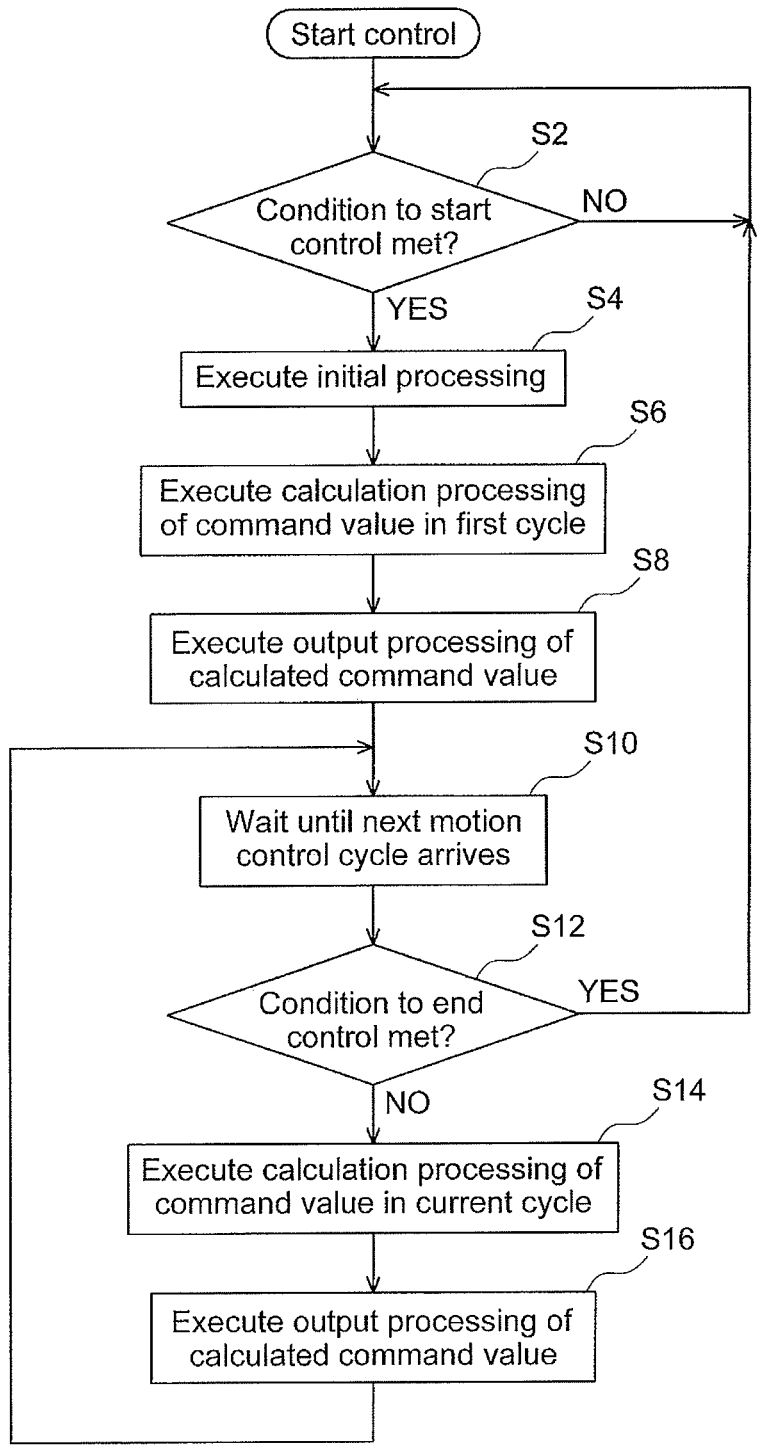
FIG. 4 is a flowchart showing a schematic processing procedure of a motion control provided by a control program.

FIG. 4 is a flowchart showing a schematic processing procedure of a motion control provided by the control program 230. With reference to FIG. 4, the microprocessor 100 periodically determines whether or not the condition to start the control related to the motion of the motor is met (step S2). The determination on whether or not the condition to start the control is met is made by the user program 236 and the sequence instruction computation program 232. If the condition to start the control is not met (NO in step S2), the determination of step S2 is repeated.

If the condition to start the control is met (YES in step S2), the microprocessor 100 executes the initial processing related to the motion control (step S4). The initial processing includes calculation processing of start position coordinate, end position coordinate, initial speed, initial acceleration, path, and the like of the motion of the motor. The microprocessor 100 then executes the calculation processing of the command value in a first cycle (step S6). Furthermore, the microprocessor 100 executes an output processing of the calculated command value (step S8).

Thereafter, the microprocessor 100 waits until the next motion control cycle arrives (step S10). The microprocessor 100 then periodically determines whether or not a condition to end the control related to the motion of the motor is met (step S12). "The condition to end the control is met" means that a state in which the servo motor 4 has reached the end position, for example. If the condition to end the control is met (YES in step S12), the processing of step S2 and the subsequent steps are again repeated. In this case, the motion computation program 234 being activated is maintained in the inactive state until a new condition to start the control is met.

If the condition to end the control is not met (NO in step S12), the microprocessor 100 executes the calculation processing of the command value in the current cycle (step S14). Furthermore, the microprocessor 100 executes the output processing of the calculated command value (step S16). The processing of step S10 and the subsequent steps are then repeated.

Hereinafter, the function module for realizing the motion control is also referred to as "motion control function module". Specifically, the "motion control function module" is a function module that executes the output of the command value to the axis and that executes the acquisition of the information from the axis, at a constant cycle using target values (position, speed, torque, etc.) given by the user program. The "motion control function module" is an open loop type controller that outputs the command value to the servo driver. The instruction (function block (it will be called "FB" too, below), etc.) that gives an order to the motion control function module is referred to as "motion control instruction".

Figure 5:
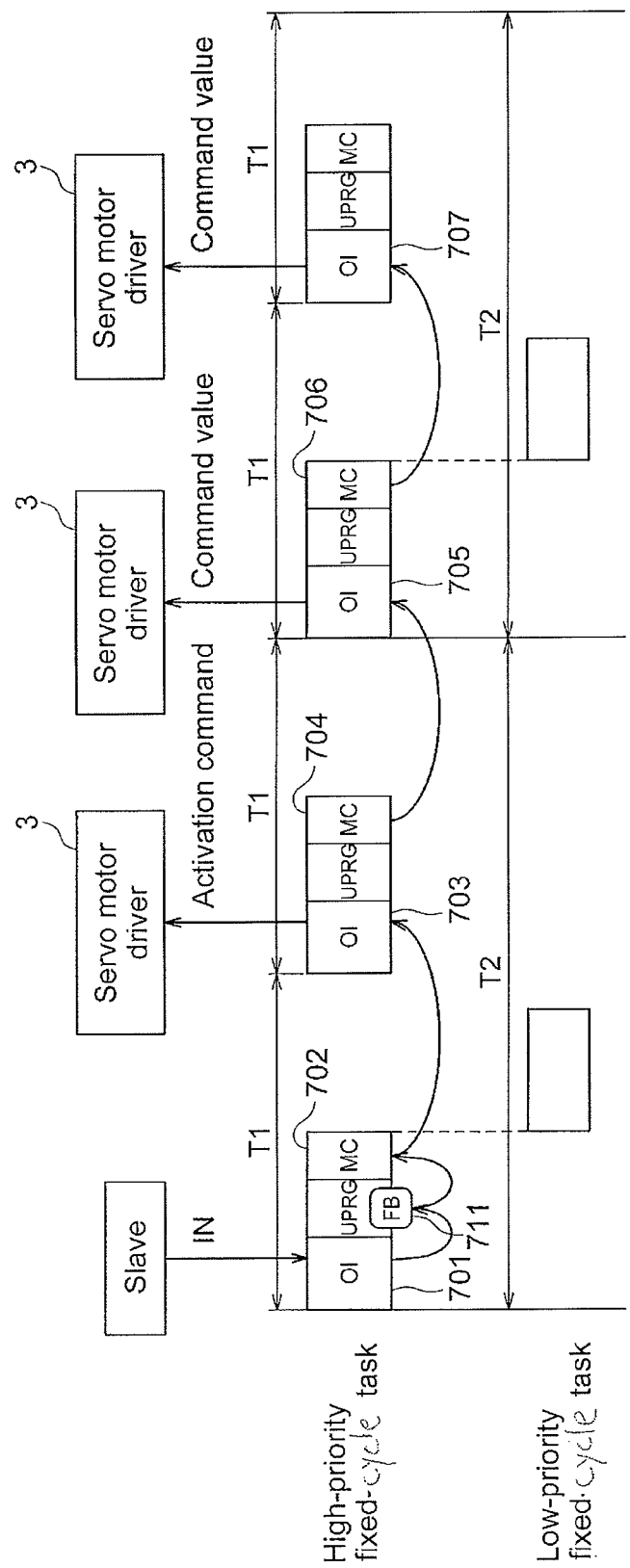
FIG. 5 is a view showing a data flow in a case where a motion control instruction is described in a high-priority fixed-cycle task.

FIG. 5 is a view showing a relationship of the motion control instruction and the task. Specifically, FIG. 5 is a view showing a data flow in a case where a motion control instruction is described in a high-priority fixed-cycle task. The high-priority fixed-cycle task is a task having the highest priority in the CPU unit 13. With reference to FIG. 5, in case where the motion control instruction is described in the UPRG 710, the order of the data flow is as follows: (1) the slave, the OI 701, FB 711, the MC 702, the OI 703, and the servo motor driver 3; (2) the MC 704, the OI 705; and the servo motor driver 3; and (3) the MC 706, the OI 707, and the servo motor driver 3.

Figure 6:
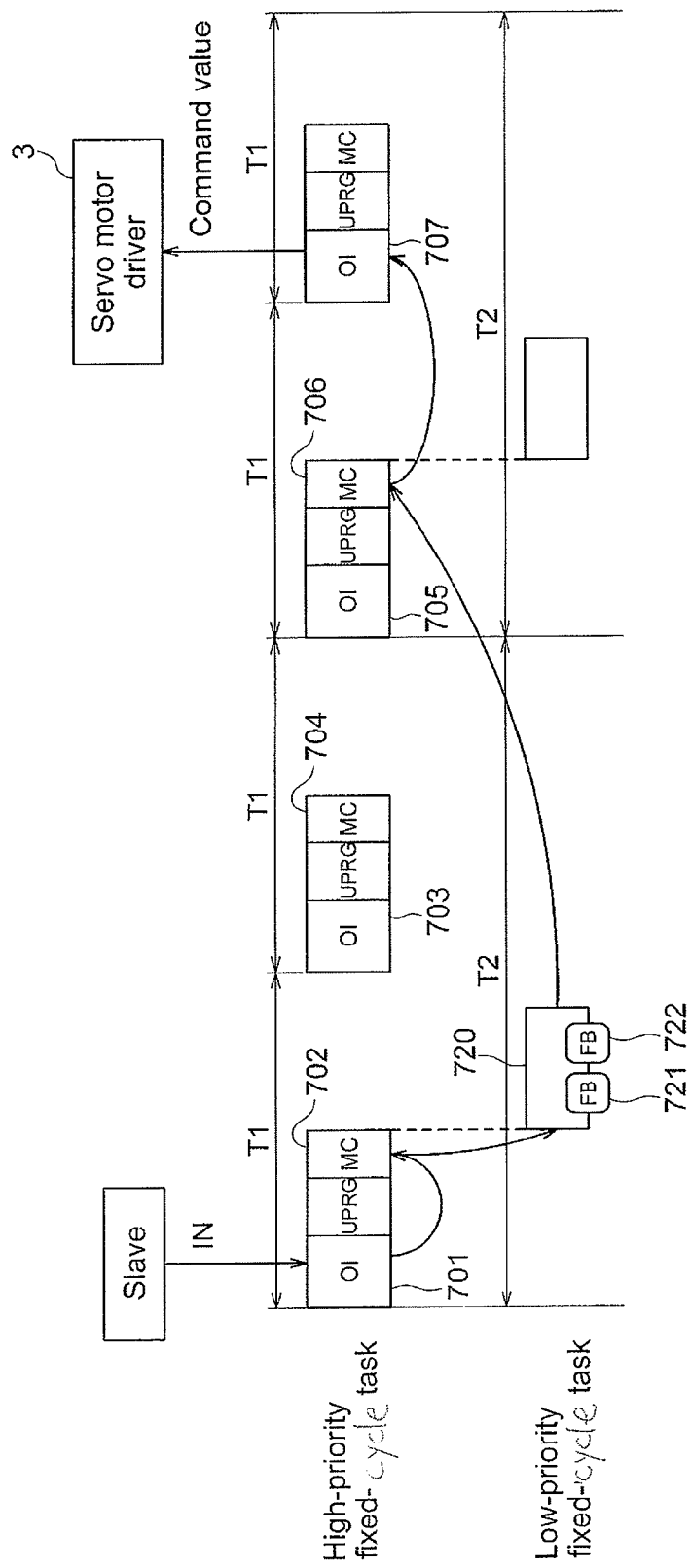
FIG. 6 is a view showing a data flow in a case where the motion control instruction is described in a low-priority fixed-cycle task.

FIG. 6 is a view showing a data flow in a case where the motion control instruction is described in a low-priority fixed-cycle task. In this case, the order of the data flow is as follows; the slave, the OI 701, the MC 702, the UPG 720 (FB 721, 722), the MC 706, the OI 707, and the servo motor driver 3.

If the high-priority fixed-cycle task becomes executable during the execution of the low-priority fixed-cycle task, the low-priority fixed-cycle task is once interrupted, and the high-priority fixed-cycle task is executed. After the high-priority fixed-cycle task is completed, the execution of the low-priority fixed-cycle task is resumed. A period T2 of the low-priority fixed-cycle task is an integral multiple of a period T1 of the high-priority fixed-cycle task. FIG. 5 shows a case of T2=2T1.

During the execution of the PLC 1, the microprocessor 100 is in a state of being able to execute at least the output/input processing program (the output processing program 214 and the input processing program 216), the user program 236, and the motion computation program 234. Strictly speaking, the real time OS 200 holds the process (or sled) related to the respective programs in an executable state, and each program is executed at an appropriate timing and in an appropriate order by having the scheduler program 212 use the real time OS 200 or hardware resources (system timer 108, etc.). Thus, start/interruption/end, and the like of the execution related to the respective programs are controlled by the scheduler program 212.

In FIG. 5, the field network controller 140 (see FIG. 2) receives the motion control input data and stores the motion control input data in a field network reception buffer (not shown) of the main memory 104, and/or the PLC system bus controller 120 receives the motion control input data and stores the motion control input data in a PLC system bus reception buffer (not shown) of the main memory 104 on the basis of the input (IN) from the slave to the OI 701. The CPU unit 13 is set as the master, and the respective units other than the CPU unit 13 are set as the slave.

Activation command data or motion command value data is output in accordance with the instruction of the IO processing program 218. More specifically, the activation command data and the motion command value data stored in the work region (not shown) of the control program of the main memory 104 are transferred to a field network transmission buffer (not shown) of the main memory 104. Following the data transfer to the field network transmission buffer, the field network controller 140 transmits the activation command data or the motion command value data to the servo motor driver 3.

In the input (IN) from the slave to the OI 701, input data that is used for the computation in the user program 236 but not used for the computation in the motion computation program 234 is also input. Furthermore, even if the user program output data generated by the execution of the user program 236 is the output data that is not used for the computation in the motion computation program 234, the user program output data is transmitted to the IO processing program 218 and output during the processing of the OI.

The "motion control cycle" according to the present embodiment is the cycle of execution and communication of the motion computation program 234, that is, the cycle of a series of processing executed in the cycle where the motion command value data is provided to the servo motor driver 3.

E. Electronic CAM

The electronic CAM operation will be described hereinafter as a function of the synchronization control. The "synchronization control" refers to controlling the position of the slave axis (control target axis) in synchronization with the position of the master axis (input axis). One of the position of the encoder for the full closed loop control, the command positions of the servo driver and the virtual servo driver, as well as the feedback positions of the encoder, the servo driver, and the virtual servo driver can be specified as the master axis. The "electronic CAM operation" refers to the function of performing the CAM operation at a control cycle according to the CAM pattern set by the CAM table. "CAM table" is a structure array in which displacements of the slave axis of the electronic CAM are each associated with a phase of the master axis of the electronic CAM.

Since the CPU unit 13 controls the output by computing in synchronization with the input for every control cycle, the computation result may be greater than the highest speed that can be output with the motion control function module. In this case, however, the CPU unit 13 performs the output at the highest speed without considering it as an error. The CPU unit 13 distributes and outputs the lacking movement amount resulted from saturation at the highest speed into the next control cycle and thereafter.

Figure 7:
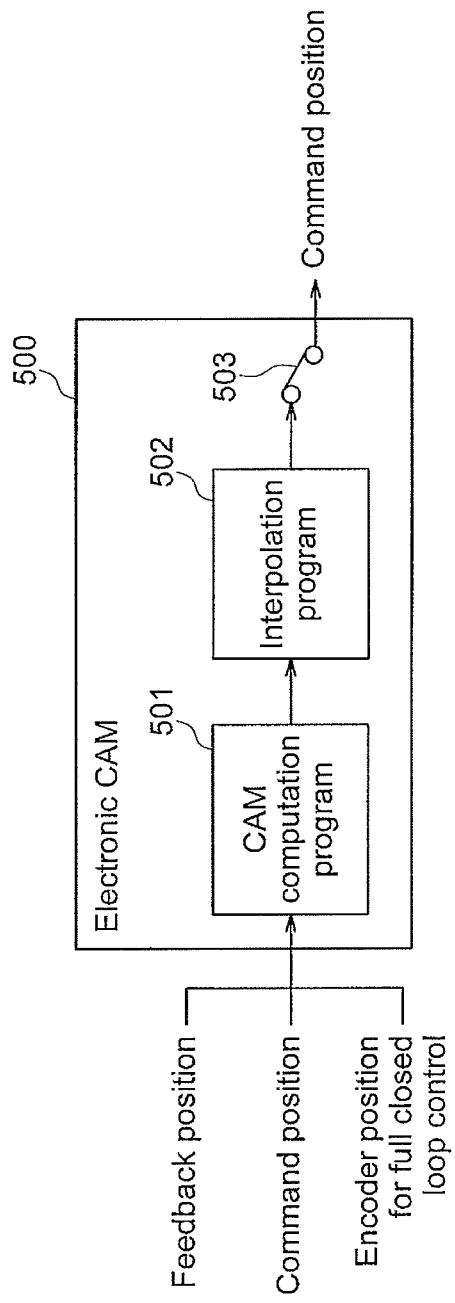
FIG. 7 is a view showing a function outline of an electronic CAM.

FIG. 7 is a view showing a function outline of the electronic CAM. With reference to FIG. 7, an electronic CAM 500 includes a CAM computation program 501, an interpolation program 502, and a switch unit 503. It should be noted that the electronic CAM 500 is realized by the CPU unit 13 and programs executed by the CPU unit 13.

The CAM computation program 501 is input with a preselected position among the position of the encoder for full closed loop control, the command positions of the servo driver and the virtual servo driver, as well as the feedback positions of the encoder, the servo driver, and the virtual servo driver.

The CAM computation program 501 is a program configured to execute a motion control outputting position instruction values corresponding to displacements of the slave axis of the electronic CAM, associated with the phase of the master axis of the electronic CAM, using the CAM table. Specifically, the CAM computation program 501 outputs the displacement of the slave axis to the interpolation program 502 on the basis of the phase of the input master axis and the CAM table. The interpolation program 502 performs interpolation processing using the output value from the CAM computation program 501. The interpolation program 502 outputs the value (instruction position) after the interpolation processing through the switch unit 503.

Figure 8:
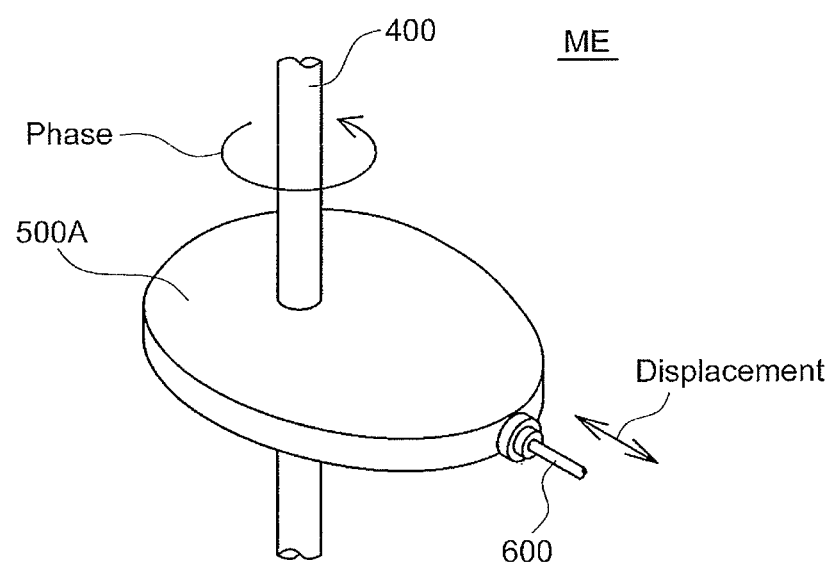
FIG. 8 is a view visually describing the operation of the electronic CAM.

FIG. 8 is a view visually describing the operation of the electronic CAM 500. Specifically, FIG. 8 is a view showing a CAM mechanism ME including a mechanical CAM 500A represented by a CAM curve based on the CAM table. With reference to FIG. 8, the CAM mechanism ME includes a master axis 400, the mechanical CAM 500A, and a slave axis 600. The mechanical CAM 500A is fixed to the master axis 400, and rotates with the rotation of the master axis 400. The slave axis 600 performs a linear motion with the rotation of the mechanical CAM 500A. That is, in the CAM mechanism ME, the slave axis 600 displaces (outputs) when the phase (input) of the master axis is changed. The electronic CAM 500 realizes the input/output in the CAM mechanism ME by software.

Figure 9:
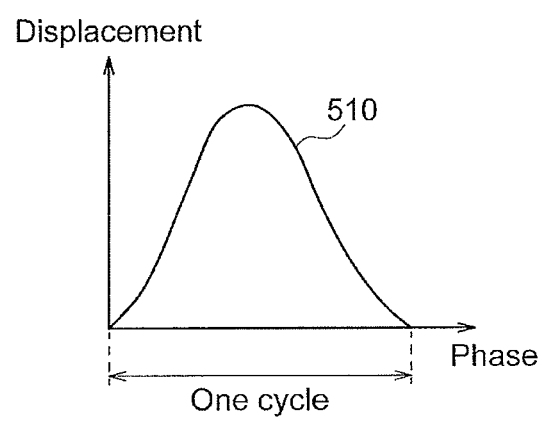
FIG. 9 is a view showing a CAM curve of the electronic CAM.

FIG. 9 is a view showing a CAM curve 510 of the electronic CAM 500. With reference to FIG. 9, in the CAM curve 510, the displacement increases from zero as the phase increases from zero, and the displacement reaches the peak at the phase (180 degrees) in a half cycle. Thereafter, the displacement reduces as the phase increases, and the displacement becomes zero at the phase (360 degrees) in one cycle. The CAM curve 510 is merely an illustration, and the CAM curve used in the PLC system SYS is not limited thereto.

Figure 10:
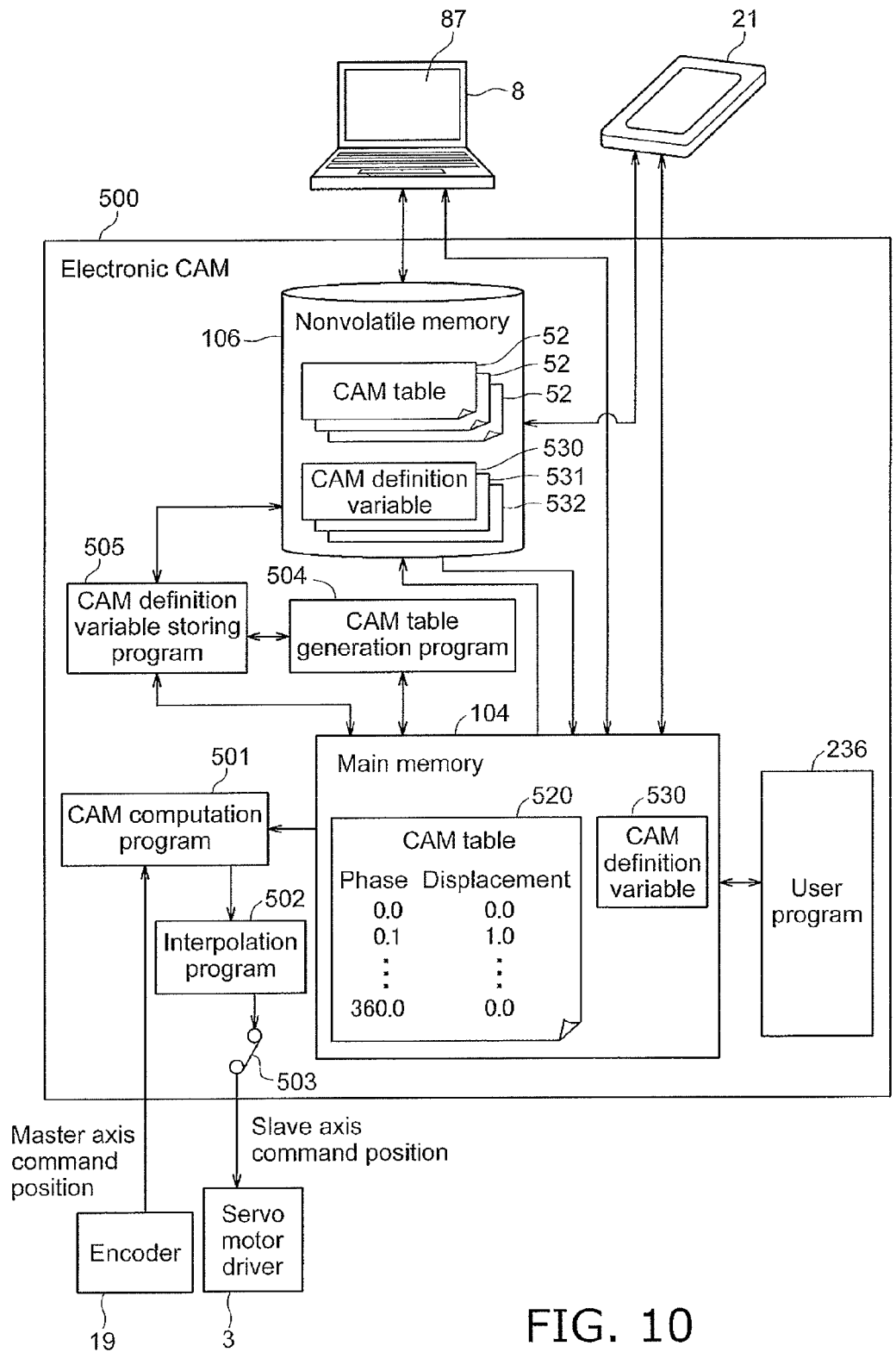
FIG. 10 is a view showing a system configuration associated with the electronic CAM.

FIG. 10 is a view showing a system configuration associated with the electronic CAM 500. FIG. 10 is a view that more specifically shows the electronic CAM 500 of FIG. 7 and is also a view showing a structure of a motion controller which performs the operation the electronic CAM. With reference to FIG. 10, the system associated with the electronic CAM 500 is realized by the CAM computation program 501, the interpolation program 502, the CAM table generating program 504, the CAM definition variable storing program 505, the main memory 104, the non-volatile memory 106, and the user program 236. In FIG. 10, as a master axis command position, encoder position is input from an encoder 19 to the electronic CAM 500.

With reference to FIG. 10, a user input/output device 21 is connected to the electronic CAM 500 (CPU unit 13). The user input/output device 21 is a tablet or a personal computer, for example, and is a device a user, who actually uses the PLC 1, uses. The user can confirm the operation state of the PLC 1 using the user input/output device 21. For example, the CAM curve, the CAM data, and the CAM definition variable can be displayed. Furthermore, the user can make and edit a CAM definition variable using the user input/output device 21, and can send the CAM definition variable to the electronic CAM 500 (CPU unit 13). For example, when the product conditions are changed, the user sends a new CAM definition variable to the electronic CAM 500 (CPU unit 13) using the user input/output device 21 in order to change the CAM curves.

It should be noted that the user input/output device 21 may have the same functions as that of the PLC support device 8 (later described).

With reference to FIG. 10, the non-volatile memory 106 stores a plurality of CAM tables 520, 521, and 522. The stored CAM tables include either those sent from the outside input device (the user input/output device 21 or the PLC support device 8), or those made in the main memory 104 and stored in the non-volatile memory 106 as later described, or both. With reference to FIG. 10, the non-volatile memory 106 stores a plurality of CAM definition variables 530, 531, and 532. The stored CAM definition variables include either those sent from the PLC support device 8 or those used for making the CAM table and stored in the non-volatile memory 106 as later described, or both. The CAM definition variable will be described later.

With reference to FIG. 10, the main memory 104 stores the CAM table 520. The detail of the CAM table 520 will be described later. It should be noted that the cam table 520 is called "CAM table No. 1" for convenience of explanation, below.

Furthermore, with reference to FIG. 10, the CAM definition variable 530 is stored in the main memory 104. The CAM definition variable 530 has been stored into the main memory 104 via the non-volatile memory 106 or directly from the user input/output device 21 or the PLC support device 8.

It should be noted that, with reference to FIG. 10, although the main memory 104 stores one CAM table and one CAM definition variable, it is actually possible to develop a plurality of CAM tables and a plurality of CAM definition variables in the main memory, too.

The CAM table generating program 504 is a program configured to receive input of the CAM definition variable which defines an electronic CAM operation to be realized by the motion control, and to generate a CAM table in which a CAM curve is stored as an array corresponding to the inputted CAM definition variable. Specifically, the CAM table generating program 504 rewrites the values of the CAM table stored in the main memory based on the CAM definition variable stored in the main memory 104, for example, to generate the new CAM table in the main memory 104. More specifically, the CAM table generating program 504 inputs new data, based on the CAM definition variable, into the CAM table (structure array) in the main memory 104 to rewrite the CAM table into the new CAM table (later described in detail).

It should be noted that since it is essential only that the CAM table name is defined and memory address for an array structure is ensured in the main memory 104 for the original CAM table to be rewritten, the original CAM table does not have to be a specific CAM table. In other words, it is possible to rewrite the currently used CAM table developed in the main memory 104, and it is also possible to generate a new CAM table without rewriting the currently used CAM table.

The CAM definition variable storing program 505 stores, after the CAM table generating program 504 is executed, for example, the inputted CAM definition variable into the non-volatile memory 106. Furthermore, at this time, the generated CAM table is stored into the non-volatile memory 106 too. Accordingly, as shown in FIG. 10, the non-volatile memory 106 stores a plurality of CAM tables and a plurality of CAM definition variables. It should be noted that the generated CAM table does not have to be stored in the non-volatile memory 106. The reason is that as long as the CAM definition variable is stored, it is possible to reconstruct the CAM curve using the CAM definition variable in the PLC support device 8, for example.

At this storing operation, furthermore, the CAM definition variable storing program 505 adds information for identifying the generated CAM table to data constituting the CAM definition variable. In this way, since the inputted CAM definition variable and the information for identifying the CAM table are associated with each other and stored in the non-volatile memory 106, it is possible to upload the CAM definition variable corresponding to the currently operated CAM table as necessary to an outside device, and to generate the CAM curve based on the CAM definition variable in the outside device. As a result, it is possible to confirm the CAM curve corresponding to the generated CAM table in the outside device. Especially, in this embodiment, it is very advantageous that the CAM curve can be confirmed in a device different from a device used for inputting the CAM definition variable. For example, even if it is the user input/output device 21 that inputted the CAM definition variable, it is possible to confirm the CAM curve in the PLC support device 8. If the information for associating the CAM definition variable with the information for identifying the CAM table is stored into the non-volatile memory 106 from the user input/output device 21 or the PLC support device 8, a process of adding the information for identifying the CAM table, which is generated by the CAM definition variable storing program 505, to data constituting the CAM definition variable may be omitted.

It should be noted that the CAM computation program 501, the interpolation program 502, the CAM table generating program 504, and the CAM definition variable storing program 505 are included in the motion computation program 234 of the system program 210.

FIG. 11 is a view showing a structure array related to the CAM data. With reference to FIG. 11, a structure array 519 is a structure array used for managing, in the main memory 104, the CAM table 520 stored in the non-volatile memory 106. In the structure array 519, the CAM table identifier, index, and value of the phase (or value of the displacement) are associated with each other. For example, the first description of the structure array 519 indicates that the index in the CAM table No. 1 (i.e., the CAM table 520) means that the first phase is "0.0".

FIG. 12 is a view showing a data structure of the CAM table. With reference to FIG. 12, the CAM table 520 is data in which the displacement of the subordination of the electronic CAM is associated with each phase of the master axis of the electronic CAM. That is, the CAM table 520 is discrete data. When linear interpolation is performed using the data in the CAM table 520, the CAM curve 510 shown in FIG. 9 is obtained. The linear interpolation is carried out by the interpolation program 502 of FIG. 7.

In the CAM table 520, the phases from 0 degree to 360 degree can be described by dividing the phases into a maximum number of CAM data. In the CAM table 520, the phase is described by 0.1 degree. The "CAM data" is the data including one displacement and one phase. That is, the CAM table 520 includes a plurality of CAM data. The unit of the displacement δ is, for example, "mm".

Furthermore, the first CAM data in which the respective values of the phase and the displacement are zero in the CAM table is a starting point of the CAM table. This point is defined as index No. 0. The CAM data one before (i.e., one above) the point where the respective values of the phase and the displacement become zero next time is a terminating point of the CAM table. That is, the significant CAM data is from the starting point of the CAM table to the terminating point of the CAM table (data in a phase range of 0 degree to 360 degrees). The "significant CAM data" is the CAM data that influences the operation of the electronic CAM. The number of the index, which is the identifier of the CAM data; is given to the significant CAM data. The number of the index is given in ascending order in the CAM table.

The CAM data after (i.e., below) the terminating point of the CAM table is the CAM data that does not influence the operation of the electronic CAM (i.e., non-significant CAM data). Both the phase and the displacement do not need to be zero in the non-significant CAM data. The number of non-significant CAM data is specified by a CAM table editing software.

Figure 13A:
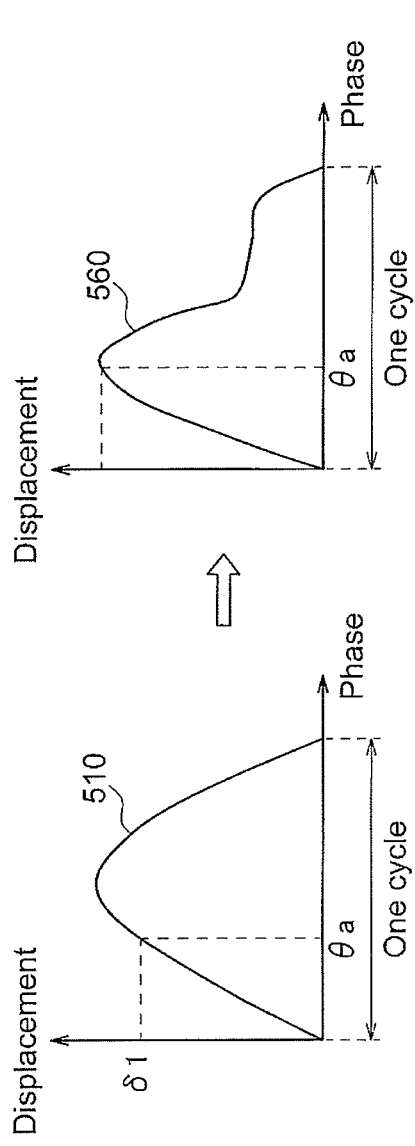
FIGS. 13A and 13B are views for explaining about a process of generating the CAM table.
Figure 13B:
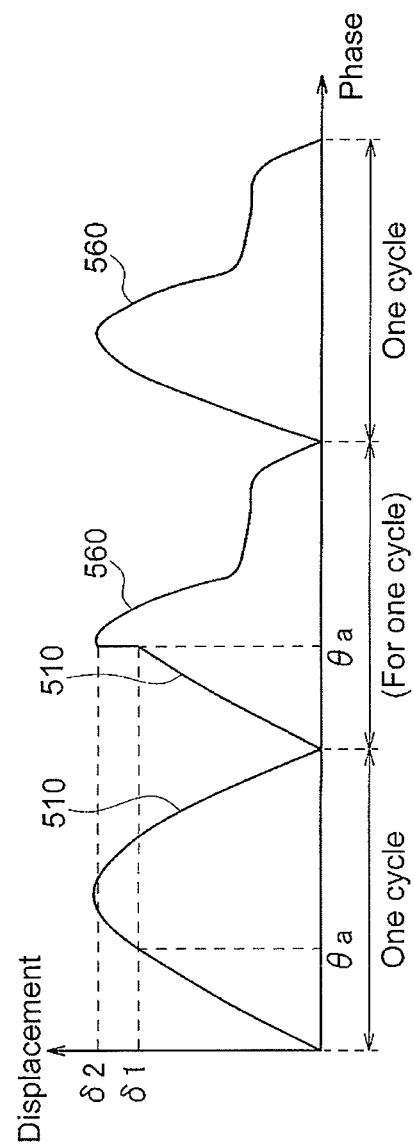

FIG. 13 is a view describing a rewriting processing of the CAM table. Specifically, FIG. 13 is a view describing the processing in which the CPU unit 13 changes the contents (CAM data) of the CAM table while the CPU unit 13 is performing the processing based on the previous CAM table.

FIG. 13 (a) is a view showing the CAM curve 510 based on the pre-changing CAM table and the CAM curve 560 based on the post-changing CAM curve 560. FIG. 13 (b) is a view describing the operation of the electronic CAM before and after the generation of the CAM table.

With reference to FIG. 13 (a), the displacement at the phase θa in the CAM curve 510 is δ1, and the displacement at the phase θa in the CAM curve 560 is δ2 (δ2>δ1).

With reference to FIG. 13 (b), when receiving the command to change the displacement at the time point associated with the phase θa, the CPU unit 13 operates the slave axis to be controlled using the CAM curve 560 in a next control cycle and thereafter. More specifically, the CPU unit 13 continues the CAM operation from the phase θb (θb>θa), which is in the vicinity of the phase θa of the CAM curve 560. Specifically, when performing the rewriting process of the CAM table, the CPU unit 13 starts the control using the new CAM table from the phase in the CAM table at the time of the generation of the curve (more precisely, straight line aggregate), so as to have continuity with the phase in the CAM table before the rewriting.

Therefore, in the switching shown in FIG. 13 (b), the value of the displacement δ, which is the command value, drastically changes from δ1 to δ2 at the time point of the phase θa. In this case, a smoothing process may be performed as necessary.

Figure 14:
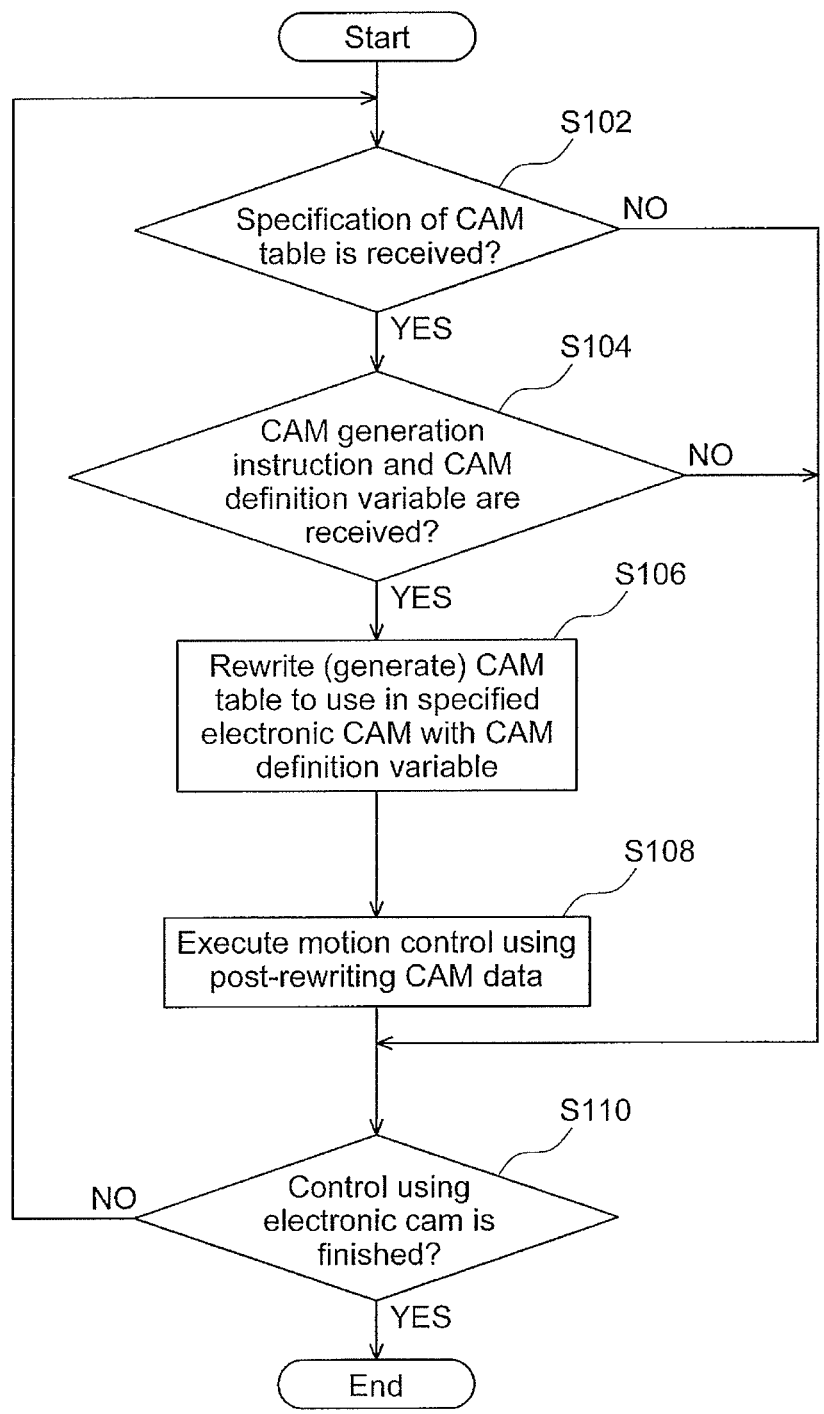
FIG. 14 is a flowchart showing a procedure of generating the CAM table.

FIG. 14 is a flowchart showing a procedure of generating the CAM table.

According to the following flowchart, if the microprocessor 100 receives the input of the CAM definition variable, the microprocessor 100 executes the CAM table generating program 504 to generate a CAM table, and stores the generated CAM table into the main memory 104. Furthermore, the microprocessor 100 performs the CAM computation program 501 using the generated CAM table to execute the electronic CAM operation.

Specifically, with reference to FIG. 14, the microprocessor 100 determines whether or not it has received a designation of the CAM table to be changed among a plurality of electronic CAMs from the user input/output device 21, for example, in step S102.

If it is determined that the designation has not been received (NO in step S102), the microprocessor 100 advances the process to step S110. If it is determined that the designation has been received (YES in step S102), the microprocessor 100 determines whether or not it has received a CAM table generating command and an input of the CAM definition variable from the user input/output device 21, for example, in step S104. It should be noted that when being inputted, the CAM definition variable is stored into the non-volatile memory 106 and then copied into the main memory 104 or is directly stored into the main memory 104.

If it is determined that the microprocessor 100 has not received the CAM table generating command and the CAM definition variable (NO in step S104), the microprocessor 100 advances the process to Step S110. If it is determined that the microprocessor 100 has received the CAM table generating command and the CAM definition variable (YES in step S104), the microprocessor 100 performs the CAM table generating program 504 to generate a CAM table to be used for a designated electronic CAM (e.g., the electronic CAM No. 1) based on the inputted CAM definition variable in step S106. As a result, the new CAM table is stored into the main memory 104.

Furthermore, at this time, the microprocessor 100 performs the CAM definition variable storing program 505 to store the CAM definition variable in the main memory 104 into the non-volatile memory 106.

At step S108, the microprocessor 100 performs the CAM computation program 501 to execute a motion control using the CAM data which has been generated. At step S110, the microprocessor 100 determines whether or not the control using the designated electronic CAM has been finished. If it is determined that the control is finished (YES in step S108), the microprocessor 100 finishes the series of processes. If it is determined that the control is not finished (NO in step S108), the microprocessor 100 advances the process to step S102.

As described above, since it is the microprocessor 100 of the CPU unit 13 that generates the CAM table, it is not necessary to use a dedicated setting tool for generating a CAM table (e.g., the PLC support device 8 in this embodiment). As a result, it is easy to generate a CAM table.

Figure 15:
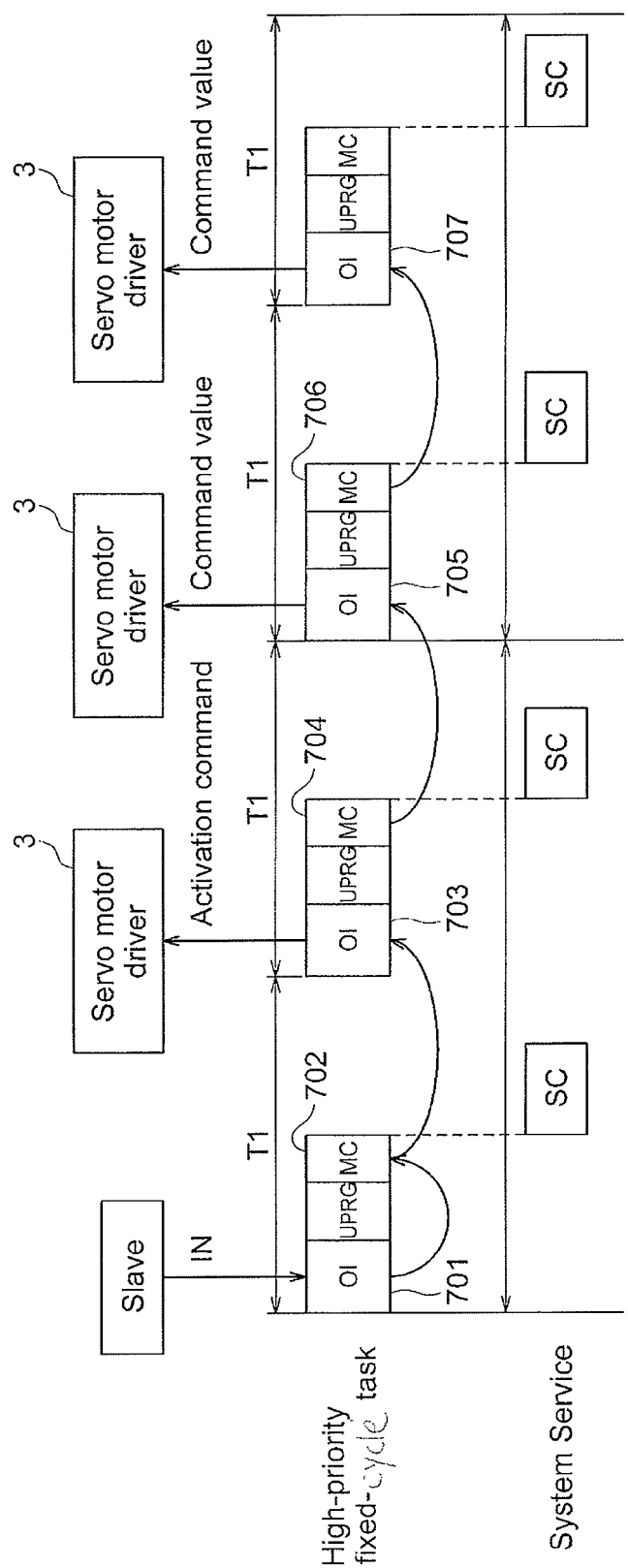
FIG. 15 is a view showing timing of executing the system service.

FIG. 15 is a view showing timing of executing system service SC. As described above, the motion control function module is executed in the high-priority fixed-cycle task. The system service SC is executed in the spare time after the fixed-cycle task including the high-priority fixed-cycle task is finished.

The system service SC is executed in the spare time after the fixed-cycle task, and a process to be executed may be one which is not directly related to outputting the information to the axis and obtaining the information from the axis. The electronic CAM (later described) and the computation process of the CAM table generating command (later described) may be executed in the system service SC. In a case where the computation process of the CAM table generating command is executed in the system service SC, a beneficial effect is achieved in which the computation load does not affect the fixed-cycle task and operation because the computation process of the CAM table generating command is executed in the spare time after the fixed-cycle task. Furthermore, it is the system program 210 that controls whether the computation process of the CAM table generating program is executed in the high-priority fixed-cycle task or in the system service SC.

F. Support Device

The PLC support device 8 for creating programs to be executed by the PLC 1, performing maintenance of the PLC 1, and the like will now be described.

Figure 16:
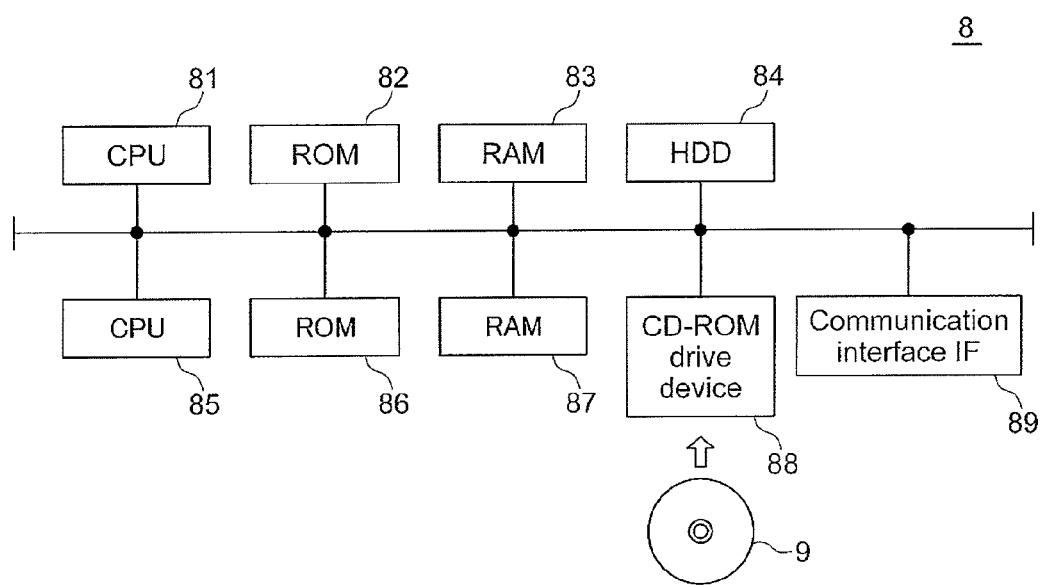
FIG. 16 is a schematic view showing a hardware configuration of the PLC support device to be used when connected to the CPU unit.

FIG. 16 is a schematic view showing a hardware configuration of the PLC support device 8 to be used when connected to the CPU unit according to the embodiment of the present invention. With reference to FIG. 16, the PLC support device 8 is typically a general-purpose computer. A notebook personal computer that excels in portability is preferable from the standpoint of maintenance.

With reference to FIG. 16, the PLC support device 8 includes a CPU 81 for executing various types of programs including the OS, a ROM (Read Only Memory) 82 for storing BIOS and various types of data, a memory RAM 83 for providing a work region for storing data necessary for the execution of the programs at the CPU 81, and a hard disc drive (HDD) 84 for storing in a nonvolatile manner the programs executed by the CPU 81, and the like.

The PLC support device 8 also includes a keyboard 85 and a mouse 86 for receiving operation from the user, and a display 87 for presenting information to the user. The PLC support device 8 also includes a communication interface (IF) for communicating with the PLC 1 (CPU unit 13), and the like.

As will be hereinafter described, the various types of programs executed by the PLC support device 8 are distributed while being stored in a CD-ROM 9. The program stored in the CD-ROM 9 is read by a CD-ROM (Compact Disk-Read Only Memory) drive 88, and stored into the hard disc drive (HDD) 84, and the like. Alternatively, the program may be downloaded from a higher level host computer, and the like through the network.

Figure 17:
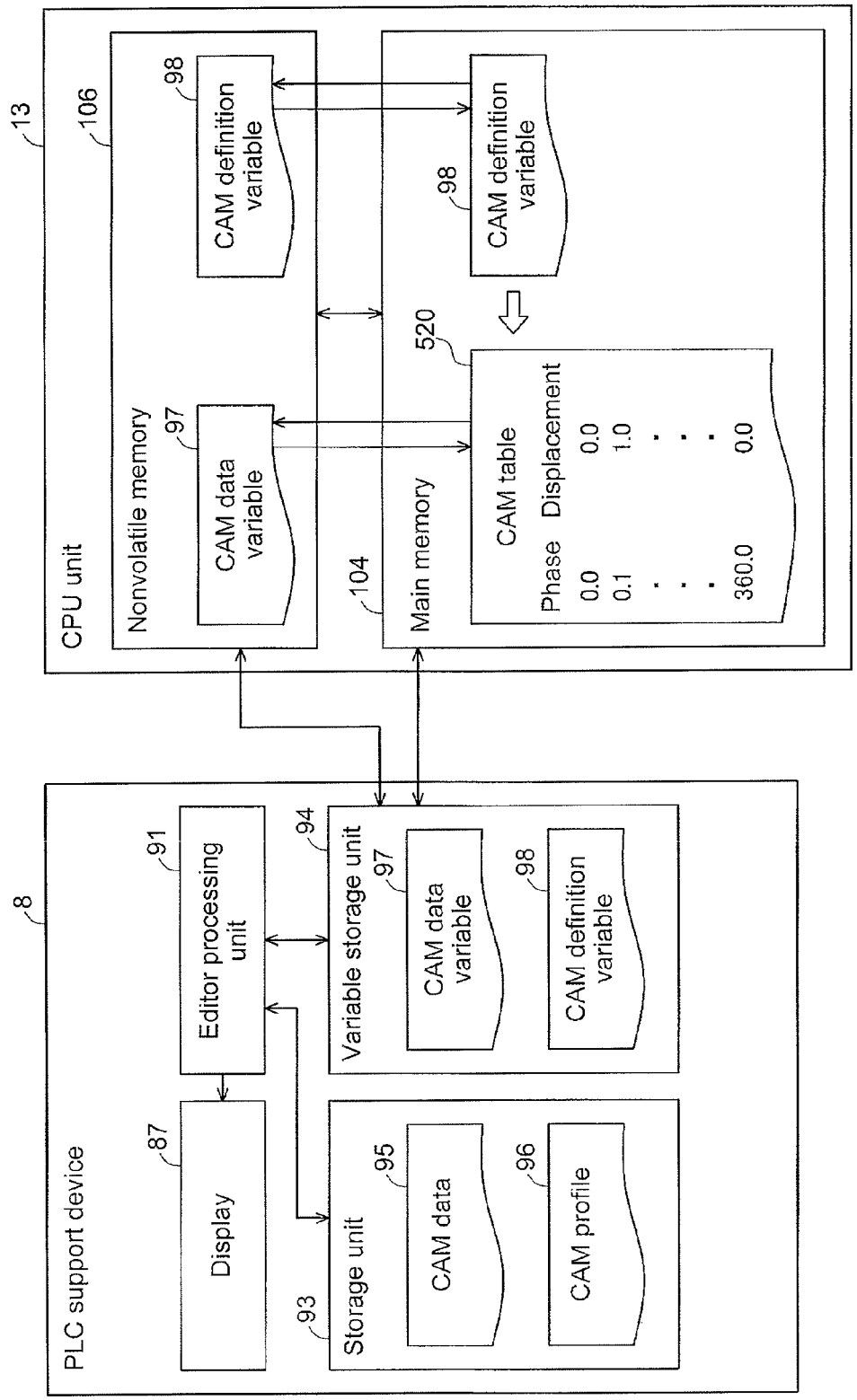
FIG. 17 is a diagram showing data processes at the CPU unit and the PLC support device.

FIG. 17 is a diagram showing data process in the CPU unit and the PLC support device. With reference to FIG. 17, the PLC support device 8 includes an editor processing unit 91, the display 87, a storage unit 93, and a variable storage unit 94.

The editor processing unit 91 has functions of displaying and editing the CAM curve constituted by CAM data 95. The display 87 can display various data such as the CAM data and the CAM curve. The storage unit 93 is configured to store the CAM data 95 and the CAM profile 96. The variable storage unit 94 is configured to store CAM data variable 97 (variable constituting the CAM data of the CAM table) and CAM definition variable 98.

The editor processing unit 91 has functions of reading out the CAM data 95 stored in the storage unit 93, making a CAM profile 96, and then displaying a graph on the display 87. The editor processing unit 91 has a function of generating the CAM data variable 97 based on the CAM data 95, and storing the CAM data variable 97 into the variable storage unit 94. The editor processing unit 91 has a function of generating the CAM definition variable 98, and storing the generated CAM definition variable 98 into the variable storage unit 94 when the CAM data variable 97 is formed. The storage unit 93 and the variable storage unit 94 are realized by the above-described memory RAM 83, hard disc drive (HDD) 84 or the like.

Furthermore, the editor processing unit 91 has functions of generating (reconstructing) the CAM data 95 or the CAM curve based on the CAM definition variable 98 stored in the variable storage unit 94 and displaying it on the display 87.

As described above, the CAM definition variable 98, which has been used for generating the CAM table 520 in the main memory 104 of the microprocessor 100 of the CPU unit 13, is stored in the non-volatile memory 106. This CAM definition variable 98 will be downloaded from the CPU unit 13 to the PLC support device 8 and will be stored into the variable storage unit 94 if the support manager operates the PLC support device 8. The editor processing unit 91 can reconstruct the modified CAM data 95 and the CAM curve in the PLC support device 8 using the stored CAM definition variable 98, and can display the CAM curve on the display 87, for example.

The support manager can easily change the electronic CAM operation using the PLC support device 8. For example, the support manager downloads the information for identifying the electronic CAM to be changed to the CPU unit 13. Furthermore, the user downloads the CAM generating instruction and the CAM definition variable 98 corresponding to the CAM table to be generated, to the CPU unit 13. As a result, the CAM table 520 is generated in the CPU unit 13, and the electronic CAM operation is executed based on the CAM table 520. The PLC support device 8 can designate a specific CAM definition variable among a plurality of CAM definition variables stored in the CPU unit 13, and can directly write values of the CAM definition variable into the main memory 104.

The user can easily change electronic CAM operation using the user input/output device 21. For example, the user downloads the information for identifying the electronic CAM to be changed to the CPU unit 13. Furthermore, the user downloads the CAM generating instruction and the CAM definition variable corresponding to the CAM table to be generated, to the CPU unit 13. As a result, the CAM table 520 is generated in the CPU unit 13, and the electronic CAM operation is executed based on the generated CAM table 520.

In a case where the electronic CAM operations is changed by the user as described above, it is desired or required for the support manager to confirm the curve of the changed electronic CAM, e.g., the one during the operation, using the PLC support device 8. In this case, the support manager uploads the CAM definition variable used for changing the electronic CAM operation, using the PLC support device 8, from the non-volatile memory 106 of the CPU unit 13. Then, the support manager reconstructs the CAM data or the CAM curve using the editor processing unit 91 of the PLC support device 8 based on the uploaded CAM definition variable, and displays it on the display 87, print it, or edit it.

Since the CAM definition variable used for changing the electronic CAM operation is associated with the generated CAM table and is stored in the CPU unit 13, the PLC support device 8 can designate CAM definition variable corresponding to the CAM table which is now used for the operation among the stored plurality of CAM definition variables, and can directly read out the values of the CAM definition variable from the main memory 104. Furthermore, the PLC support device 8 can read out the CAM definition variable used for changing the electronic CAM operation in the past, from the CPU unit 13.

Figure 18:
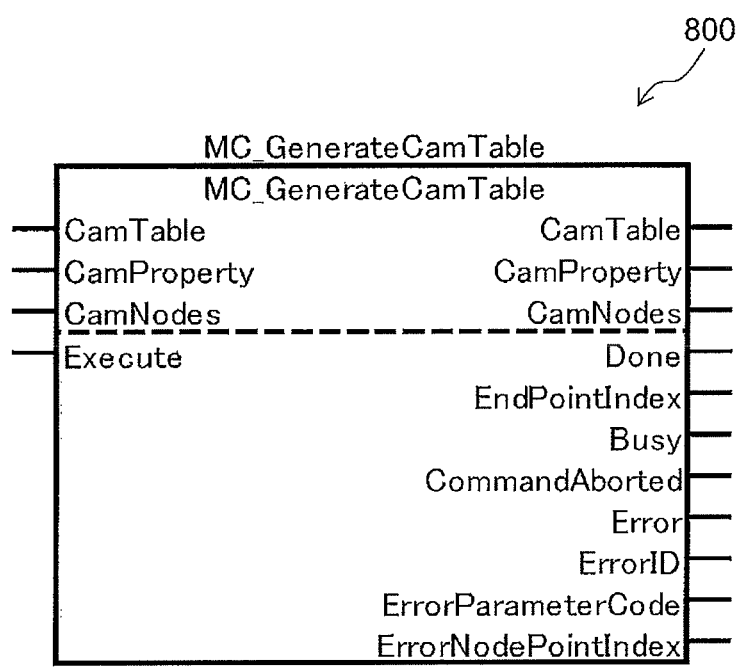
FIG. 18 is a diagram showing a summary of the control instruction realizing the CAM table generating program.

G. Detail of the Control Instruction for Realizing the CAM Table Generating Program FIG. 18 is a diagram showing a summary of the control instruction for realizing the CAM table generating program. The control instruction FB 800 corresponds to the control instruction FB 711 and the control instructions FB 721, 722 in FIG. 6. The name of the control instruction FB 800 is MC_GenerateCamTable (CAM table generation), which includes Execute (actuation) as input variables, Done (finished), EndPointIndex (end point index), Busy (being executed), CommandAborted (execution interruption), Error (error), ErrorID (error code), ErrorParameterCode (parameter detail code), ErrorNodePointIndex (node point element number) as output variables. Execute (activation) starts the instructions at the time of actuation. Done (finished) becomes TRUE (1) when the execution of the instruction is finished. EndPointIndex (end point index) outputs the end point index when the execution of the instruction is finished.

MC_GenerateCamTable (CAM table generation) includes, as input/output variables, CamTable (cam table), CamProperty (cam property), and CamNodes (cam node). CamProperty (cam property) and CamNodes (cam node) are the above-described CAM definition variables.

The CamTable (cam table) is defined by a structure array, as described above.

CamProperty (cam property) is defined by array variables, and values of the elements correspond to a part of "property setting" in the CAM profile curve setting. CamProperty (cam property) includes as member variables, InitVel (initial velocity of the start node point), InitAcc (initial acceleration of the start node point), and Cycletime (cycle time, which is the time necessary for one cycle of the CAM operation).

CamNodes (cam node) is defined by array variables, and the arrays correspond to "node points" in the CAM profile curve setting. CamNodes (cam node) includes, as member variables, Phase (master axis phases, which designate the value of the master axis phase of the node point), Distance (slave axis displacements, which designate the value of the slave axis displacements of the node point), and Curve (curve shape, which is shaped as the CAM curve to the node point).

It should be noted that parameters of CamProperty (cam property) and CamNodes (cam node) correspond to items of the CAM profile curve setting in the editor processing unit 91 (FIG. 17).

Figure 19:
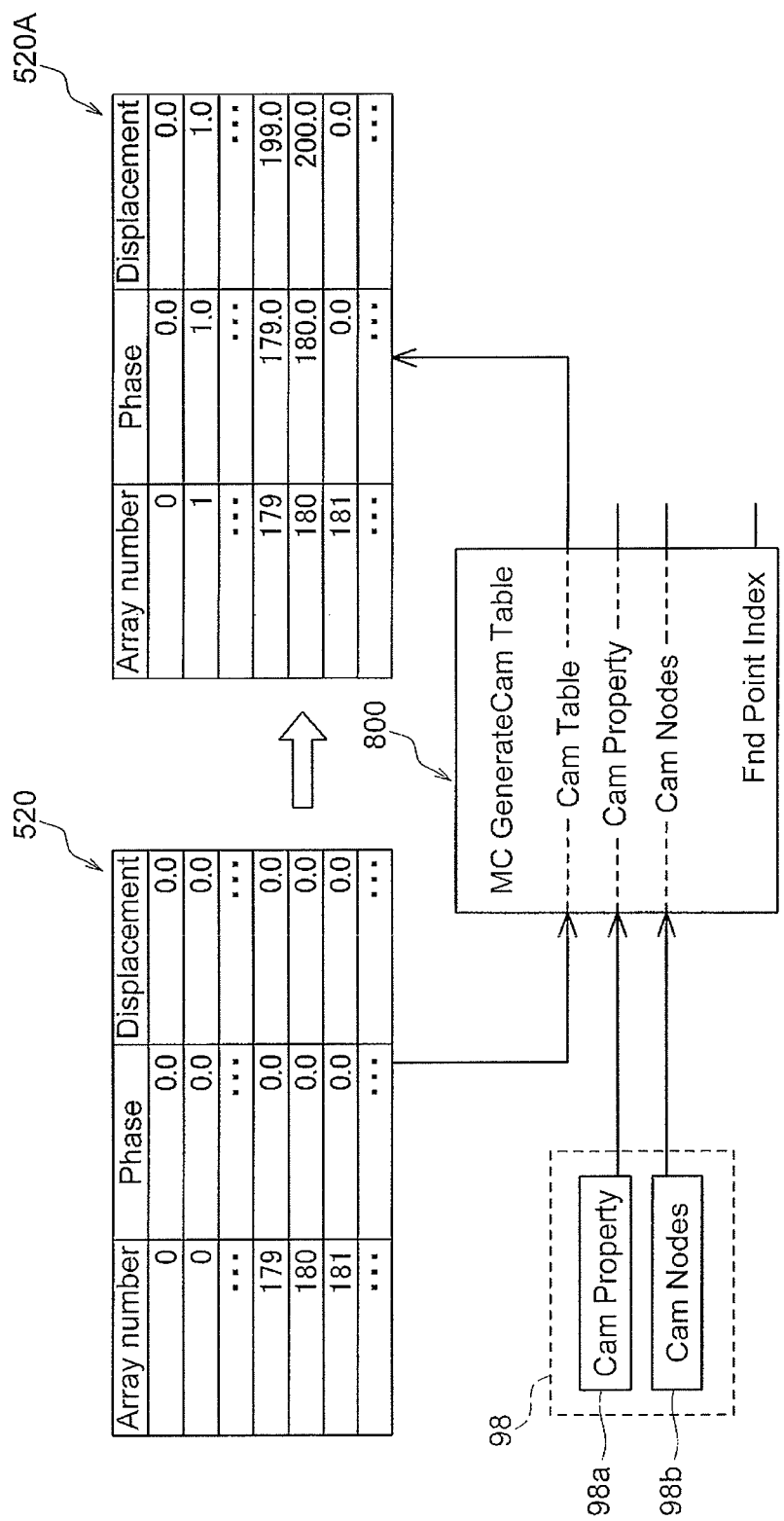
FIG. 19 is a diagram showing an execution image of the control instruction.

FIG. 19 is a diagram showing the execution image of the control instruction. With reference to FIG. 19, the control instruction FB 800 generates CAM data by computation according to values of CamProperty 98a (cam property) and CamNodes 98b (cam node) of the CAM definition variable 98 designated as input/output variables, at the activation of the Execute (activation), and rewrites the designated CAM table 520 (which has been developed from the non-volatile memory 106 into the main memory 104) with the generated CAM data, thereby generating a new CAM table 520A. The control instruction FB 800 updates the end point index of the CAM table when the generation (rewriting) of the CAM table is finished, and outputs the values to EndPointIndex (end point index) as an output variable, thereby finishing the execution of the instruction.

H. Detail of the Control Flow of the CAM Table Generation

Figure 20:
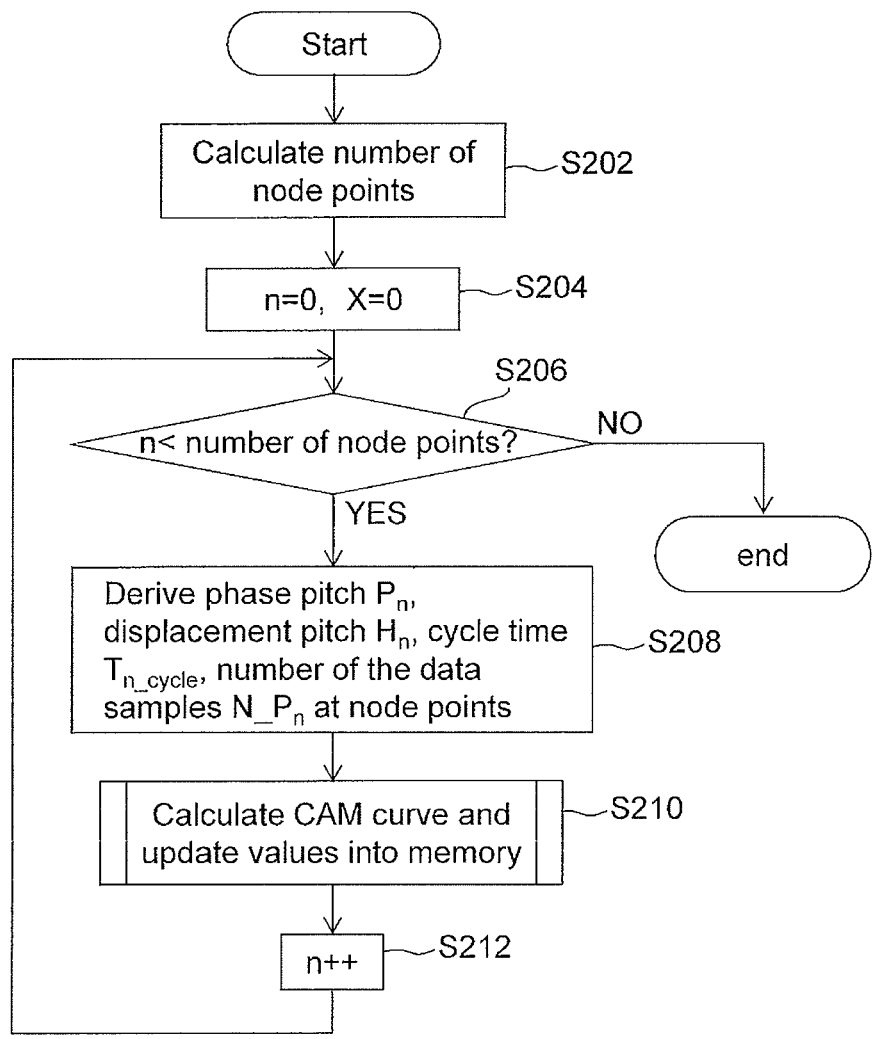
FIG. 20 is a flowchart showing a control procedure of the control instruction.
Figure 21:
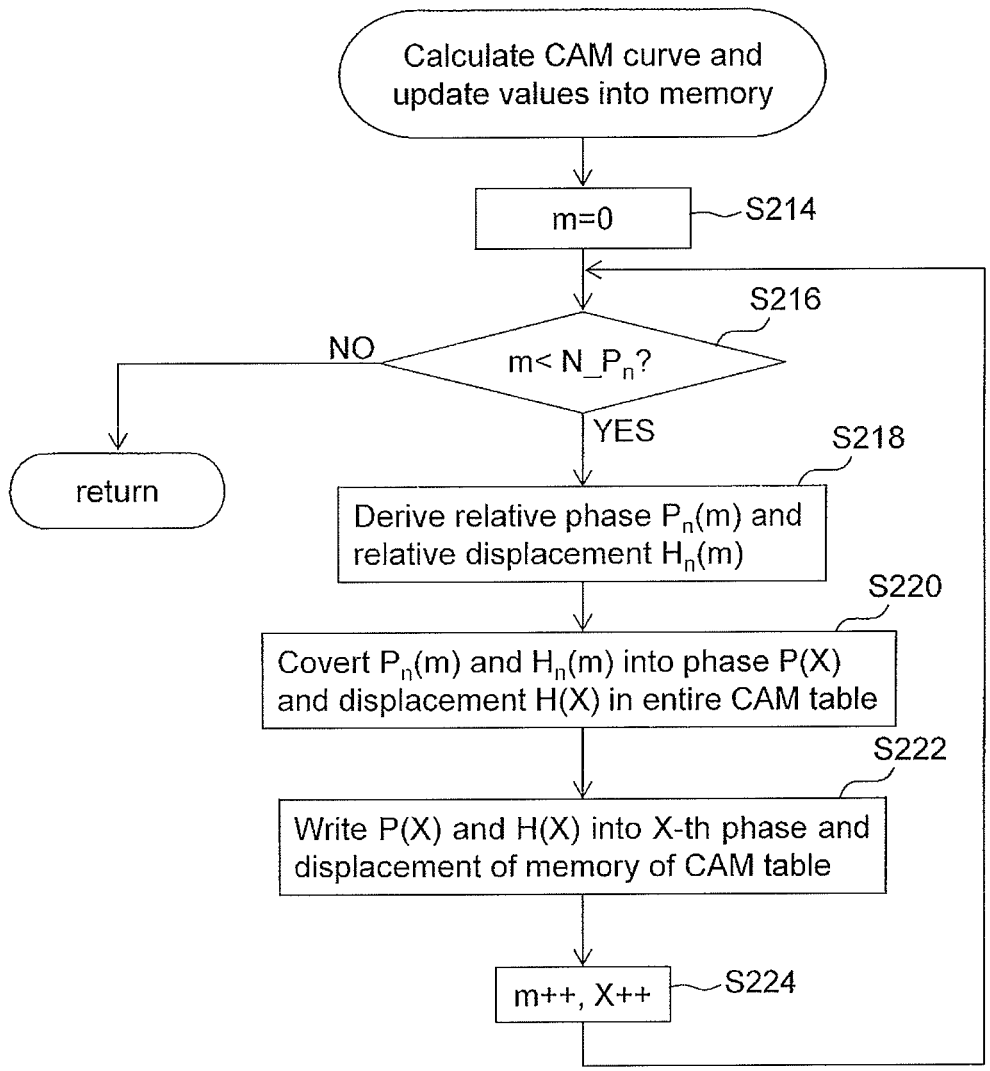
FIG. 21 is a flowchart showing a procedure of computing the CAM curve and storing values in the memory.
Figure 22:
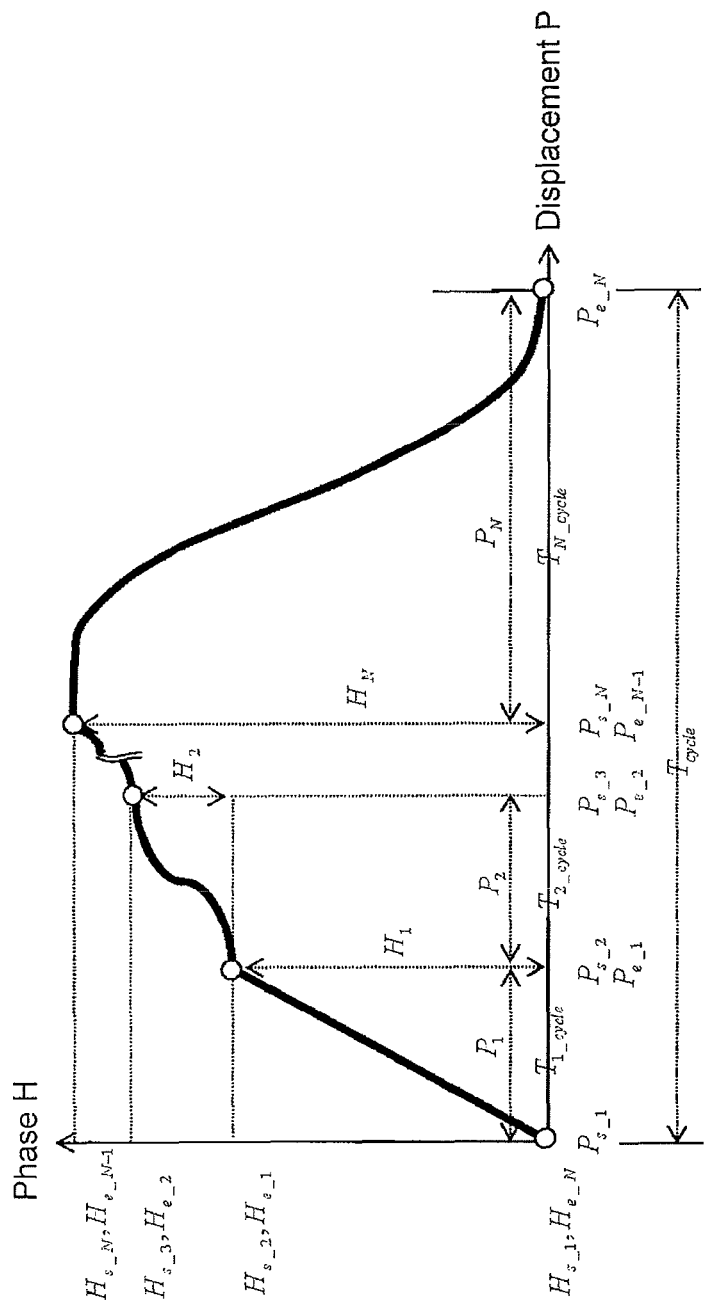
FIG. 22 is a graph (CAM curve) for explaining about the CAM table generation.

With reference to FIG. 20 through FIG. 22, the details of the control flow of the control instruction FB 800 will be described.

FIG. 20 is a flowchart showing the control procedure of the control instructions, and shows the flow when the microprocessor 100 executes the control instruction FB 800.

The microprocessor 100 calculates the number of the node points (the number of the valid node points for Cam-Node) (step S200).

The microprocessor 100 assigns 0 to variable n, and assigns 0 to variable x (step S204). The variable n is node number.

The microprocessor 100 determines whether or not the variable n is smaller than the number of the node points (step S206). If it is determined that it is smaller (YES in step S206), the microprocessor 100 advances the process to step S208. If it is determined that it is not smaller (NO in step S206), the entire process is finished because it means that the processes have been finished at all of the node points.

The microprocessor 100 derives phase pitch $P_n$, displacement pitch $H_n$, cycle time $T_{n\_cycle}$, and the number of data samples $N\_P_n$ at each of the node points (step S208).

The microprocessor 100 computes values of the CAM curve at the node points and updates the values in the memory (step S210). The details of step S210 will be described later.

The microprocessor 100 increments the variable n (step S212). After that, the process returns to step S206.

A loop of step 208 and step S209 is repeated as many times as the number of the node points, so CAM data values as CAM data are inputted into sample points, i.e., points from the start point to the end point of the node points.

Next, the detail of step S210 in FIG. 20 will be described with reference to FIG. 21 and FIG. 22. FIG. 21 is a flowchart showing a procedure of computing the CAM curve and updating values into the memory. FIG. 22 is a graph (CAM curve) for explaining about the CAM table generation.

It should be noted that the meaning of each of reference symbols in the graph of FIG. 22 is as follows.

$P_{s\_n}$: phase start point of the n-th node point (n is an integer, which may be one or more. The same applies to the following.)
$P_{e\_n}$: phase end point of the n-th node point
$H_{s\_n}$: displacement start point of the n-th node point
$H_{e\_n}$: displacement end point of the n-th node point
N: the largest number of the node points
$T_{cycle}$: time for one cycle (sec)

The microprocessor 100 inputs zero into the variable m (step S214). The variable m is the number of the samples.

The microprocessor 100 determines whether or not the variable m is smaller than the number of the data samples $N\_P_n$ (step S216). It should be noted that the number of the data samples $N\_P_n$ can be obtained from the following formula.

$N\_P_n = P_n / \Delta P_n$ ($\Delta P_n$: phase step size in the n-th node point)

If it is determined that it is smaller (YES in step S216), the microprocessor 100 advances the process to step S218. And if it is determined that it is not smaller (NO in step S216), the microprocessor 100 finishes the process.

The microprocessor 100 derives relative phase $P_n$ (m) and relative displacement $H_n$ (m) (step S218).

First, deriving of relative phases from the phase start point in the node points, i.e., relative phase $P_n$ (m), will be described. If $P_{s\_n} < P <= P_{e\_n}$, relative phase $P_n$ (m) of the m-th sample point from $P_{s\_n}$ can be obtained by the following formula.

$P_n(m) = \Delta P_n \times m$ (in a case where $m < N\_P_n$)

$P_n(m) = P_n$ (in a case where $m = N\_P_n$)

Next, deriving relative displacement $H_n$ (m), i.e., relative displacement from the displacement start point at the node points, will be described. Specifically, the microprocessor 100 derives relative displacement from the displacement start point at the node points using the designated CAM property curve formula. If $P_{s\_n} < P <= P_{e\_n}$, relative displacement $H_n$ (m) of a m-th sample point from the $P_{s\_n}$ can be obtained by the following formula.

$H_n(m) = H_n \times f(T)$ $T = (\Delta P_n / P_n) \times m$ (in a case where $m < N\_P_n$)
$T = 1$ (in a case where $m = N\_P_n$)
f ( ) and T are as follows.
f ( ): CAM table calculating formula set at the node point
T: time which will be assigned to the CAM property curve formula (0~1)

The microprocessor 100 respectively converts $P_n$ (m) and $H_n$ (m) into phase P (X) and displacement H (X) in the entire CAM table (step S220).

The microprocessor 100 respectively writes P (X) and H (X) as values of the CAM data into X-th phase and displacement in the memory of the CAM table (step S222).

The microprocessor 100 increments the variable m and the variable X (step S224).

A loop of step S218 through step S222 described above is repeated as many times as the number of the samples, so values are inputted as a plurality of CAM data in one node point.

I. Detail of Change in the CAM Data when the Control Instruction FB is Executed Hereinafter, with reference to FIG. 23 through FIG. 29, the details of the change in the CAM data during the CAM table generation will be described. FIG. 23 through FIG. 29 show a table indicating the value of the CamNodes and a table indicating the value of the CAM table that is sequentially rewritten during the CAM table generation.

In this example, the microprocessor 100 generates CAM data of the CamTable (CAM table) on a left side of FIG. 23 for rewriting based on values of the CamNodes (cam node) on a right side of FIG. 23. In the following description, it is assumed that the shape of the CAM curve is straight, for easier understanding. Accordingly, as CAM definition variable, CamProperty (cam property) is not used, and only CamNodes (cam node) is used.

In this example, the number of the array elements of the CamNodes (cam node) is four or more, the number of the array elements of the CamTable (cam table) is 4000. All of the phases and the displacements of the CamTable (cam table) are set to be undefined values.

With reference to FIG. 24, the microprocessor 100 makes phase and displacement in array number 0 of the CamTable (cam table) zero.

Figure 25:
FIG. 25 is a table indicating the value of the CamNodes, and a table indicating values of the CAM table when the CAM table is being generated.

The microprocessor 100 obtains value of the node point of the first array number in the CamNodes (cam node). Furthermore, the microprocessor 100 calculates, based on the parameters, the sample number of the CAM data, its phases, and its displacements, from start node point to the next node point (corresponding to step S208 in FIG. 20). Then, the microprocessor 100 rewrites values of the CamTable (cam table) from the array number 1 as many times as the number of the samples (corresponding to step S210 in FIG. 20 and step S214 through S224 in FIG. 21). With reference to FIG. 25, 1800 points in CAM data from the array number 1 through 1800 have been rewritten.

The microprocessor 100 calculates, as described above, the sample number of the CAM data, phases, and displacements between the node points of the array number 0 and the array number 1 (corresponding to step S208 in FIG. 20), and rewrites values of the CamTable (cam table) (corresponding to step S210 in FIG. 20 and step S214 through S224 in FIG. 21). As long as the node points remain valid, this process is repeated. With reference to FIG. 26, the microprocessor 100 has obtained value of the node point of the array number 1 in the CamNodes (cam node) and one thousand eight hundred points of the CAM data, from the array number 1801 through 3600, have been rewritten.

With reference to FIG. 27, the array number 2 in CamNodes (cam node) is an invalid node point, so the microprocessor 100 finishes calculating the CAM data (NO in step S206). The microprocessor 100 makes zero the phases of the CAM data following the ones of the array number that is written last in order to show they are invalid.

If there is no invalid node point in which the value of the phase becomes zero, and the array of the CamNodes (cam node) is finished, the microprocessor 100 makes the phase zero as well. FIG. 28 shows a case where the array element number of CamNodes (cam node) is two, and there is no invalid node point in the CAM data.

However, if there is no array element of CamTable (cam table) having a phase into which zero is to be written, zero is not written into the phase. In an example of FIG. 28, each of the total number of the generated CAM data and the array element number of the CamTable (cam table) is 3601.

The microprocessor 100 updates the end point index of the CAM table with the value of the array number of the valid CAM data which is written last. Then, the control instruction FB 800 outputs the value to the EndPointIndex (end point index). With reference to FIG. 29, the end point index is 3600. Accordingly, the execution of the instruction is finished.

J. Summary of the Process by the Control Device

The control device (for example, the CPU unit 13 in FIG. 1) is configured to execute a motion control and a sequence control. The control device includes a processor (for example, the microprocessor 100 in FIG. 2), and a storage unit (for example, the main memory 104 in FIG. 10). The storage unit is configured to store a CAM computation program (for example, the CAM computation program 501 in FIG. 10), and a CAM table (for example, the CAM table 520 in FIG. 10). The CAM computation program is configured to execute a motion control outputting position instruction values corresponding to displacements of the slave axis of the electronic CAM (for example, the electronic CAM 500 in FIG. 10) associated with the phases of the master axis of the electronic CAM, using a CAM table that is an array in which displacements of the slave axis are each associated with a phase of the master axis of the electronic CAM.

The storage unit is configured to further store a CAM table generating program (for example, the CAM table generating program 504 in FIG. 10) configured to receive a CAM definition variable (for example, the CAM definition variable in FIG. 17, a CamNodes (cam node), CamProperty (cam property) in FIG. 18) that defines the electronic CAM operation to be realized by the motion control, and to generate a CAM table which is an array of the CAM curve corresponding to the inputted CAM definition variable.

The processor performs the CAM computation program using the CAM table (for example, step S108 in FIG. 14), and to perform the motion control. Furthermore, the processor receives the input of the CAM definition variable (for example, YES in step S104 in FIG. 14), executes the CAM table generating program to generate the CAM table (for example, step S106 in FIG. 14), and stores the generated CAM table into the storage unit.

According to the control device, the processor performs the CAM computation program using the CAM table, thereby executing the motion control of outputting the position instruction values corresponding to the displacements of the slave axis associated with the phases of the master axis of the electronic CAM (for example, step S108 in FIG. 14). Furthermore, if the CAM definition variable is inputted, the processor performs the CAM table generating program to generate the CAM table (for example, step S106 in FIG. 14).

As described above, since it is the processor of the control device that generates the CAM table, it is not necessary to use a dedicated setting tool (for example, the PLC support device 8 in FIG. 1) for changing the CAM tables. As a result, it becomes easy to change the CAM tables.

The storage unit may be configured to further store a CAM definition variable storing program (for example, CAM definition variable storing program 505 in FIG. 10). The CAM definition variable storing program is configured to store the inputted CAM definition variable and information for identifying the CAM table generated by executing the CAM table generating program into the storage unit, while associating the inputted CAM definition variable with the information for identifying the CAM table.

According to this control device, since the inputted CAM definition variable and the information for identifying the CAM table are associated with each other and stored in the storage unit, it is possible to take out the CAM definition variable corresponding to the currently operating CAM table if necessary to the outside device (for example, the PLC support device 8 in FIG. 1), and to generate the CAM curve based on the CAM definition variable in the outside device.

As a result, it is possible to confirm in the outside device the CAM curve corresponding to the CAM table that has been changed.

K. Other Embodiment

The above described one embodiment of the present invention, but the present invention is not limited to that embodiment, and various modifications may be effected without departing from the spirit and scope of the invention. In particular, a plurality of the embodiments and modified examples written in the present specification can be arbitrarily combined as needed.

L. Summary of the Present Invention

The embodiments disclosed herein are illustrative in all aspects and should not be recognized as being restrictive. The scope of the present invention is defined by the Claims rather than by the description made above, and the meaning equivalent to the Claims and all modifications within the scope are intended to be enclosed herein.

INDUSTRIAL AVAILABILITY

The present invention can be broadly applied to control devices, output control methods for the control devices, and programs.

DESCRIPTION OF SYMBOLS

1: PLC device
3: servo motor driver
4: servo motor
8: PLC support device
13: CPU unit
21: user input/output device
91: editor processing unit
104: main memory
106: non-volatile memory
500: electronic CAM
501: CAM computation program
504: CAM table generating program
505: CAM definition variable storing program
520: CAM table
800: control instruction FB

The invention claimed is:

1. A control device configured to execute motion control and sequence control, the control device comprising:
a processor; and
a storage configured to store a CAM computation program configured to perform, using a CAM table that is an array in which displacements of a slave axis of an electronic CAM are each associated with a phase of a master axis of the electronic CAM, motion control to output position instruction values corresponding to the displacements of the slave axis of the electronic CAM associated with the phases of the master axis of the electronic CAM, and to store the CAM table, wherein
the storage is configured to further store a CAM table generating program, which is configured to receive an input of a CAM definition variable that defines an electronic CAM operation to be realized through the motion control, and to generate a CAM table in which a CAM curve is stored as an array corresponding to the input CAM definition variable,
the processor is configured to execute the CAM computation program using the CAM table, and to perform the motion control, and
the processor is further configured to receive the input of the CAM definition variable, generate the CAM table by executing the CAM table generating program, and store the generated CAM table into the storage,
wherein one cycle of a task schedule of the motion control comprises a fixed-cycle task and a system service, the system service executed in a spare time other than the fixed-cycle task, and
a timing of a calculation process by the CAM table generating program is assigned to the fixed-cycle task.

2. The control device according to claim 1 wherein the storage further stores a CAM definition variable storing program, and the CAM definition variable storing program stores, in the storage, the input CAM definition variable and identification information in association with each other, the identification information identifying the CAM table generated by executing the CAM table generating program.

3. A controller system comprising:
the control device according to claim 1; and
an input device configured to input data into the control device and send information that associates the CAM definition variable with information for identifying the CAM table, to the control device.

4. A control device configured to execute motion control and sequence control, the control device comprising:
a processor; and
a storage configured to store a CAM computation program configured to perform, using a CAM table that is an array in which displacements of a slave axis of an electronic CAM are each associated with a phase of a master axis of the electronic CAM, motion control to output position instruction values corresponding to the displacements of the slave axis of the electronic CAM associated with the phases of the master axis of the electronic CAM, and to store the CAM table, wherein
the storage is configured to further store a CAM table generating program, which is configured to receive an input of a CAM definition variable that defines an electronic CAM operation to be realized through the motion control, and to generate a CAM table in which a CAM curve is stored as an array corresponding to the input CAM definition variable,
the processor is configured to execute the CAM computation program using the CAM table, and to perform the motion control, and
the processor is further configured to receive the input of the CAM definition variable, generate the CAM table by executing the CAM table generating program, and store the generated CAM table into the storage,
wherein one cycle of a task schedule of the motion control includes a fixed-cycle task and a system service, the system service executed in a spare time other than the fixed-cycle task, and
a timing of a calculation process by the CAM table generating program is assigned to the system service.

5. The control device according to claim 4, wherein the storage further stores a CAM definition variable storing program, and the CAM definition variable storing program stores, in the storage, the input CAM definition variable and identification information in association with each other, the identification information identifying the CAM table generated by executing the CAM table generating program.

6. A controller system comprising:
the control device according to claim 4; and
an input device configured to input data into the control device and send information that associates the CAM definition variable with information for identifying the CAM table, to the control device.

7. An output control method of a control device configured to execute motion control and sequence control,
the control device including a processor and a storage,
the output control method comprising:
executing, by the processor, a CAM computation program, to perform, using a CAM table that is an array in which displacements of a slave axis of an electronic CAM are each associated with a phase of a master axis of the electronic CAM, motion control to output position instruction values corresponding to the displacements of the slave axis of the electronic CAM associated with the phases of the master axis of the electronic CAM;
executing, by the processor, a CAM table generating program, to receive an input of a CAM definition variable that defines an electronic CAM operation to be realized through the motion control, and to generate a CAM table in which a CAM curve is arrayed corresponding to the input CAM definition variable; and
storing, by the processor, the generated CAM table into the storage,
wherein one cycle of a task schedule of the motion control comprises a fixed-cycle task and a system service, the system service executed in a spare time other than the fixed-cycle task, and
a timing of a calculation process by the CAM table generating program is assigned to the fixed-cycle task.

8. A non-transitory computer-readable recording medium storing a program for controlling a control device configured to execute motion control and sequence control,
the control device including a processor and a storage,
the program causing the processor to perform operations comprising:
executing a CAM computation program to perform, using a CAM table that is an array in which displacements of a slave axis of an electronic CAM are each associated with a phase of a master axis of the electronic CAM, motion control to output position instruction values corresponding to the displacements of the slave axis of the electronic CAM associated with the phases of the master axis of the electronic CAM;
executing a CAM table generating program, to receive an input of a CAM definition variable that defines an electronic CAM operation to be realized through the motion control, and to generate a CAM table in which a CAM curve is arrayed corresponding to the input CAM definition variable; and
storing the generated CAM table into the storage,
wherein one cycle of a task schedule of the motion control comprises a fixed-cycle task and a system service, the system service executed in a spare time other than the fixed-cycle task, and
a timing of a calculation process by the CAM table generating program is assigned to the fixed-cycle task.

9. An output control method of a control device configured to execute motion control and sequence control,
the control device including a processor and a storage,
the output control method comprising:
executing, by the processor, a CAM computation program, to perform, using a CAM table that is an array in which displacements of a slave axis of an electronic CAM are each associated with a phase of a master axis of the electronic CAM, motion control to output position instruction values corresponding to the displacements of the slave axis of the electronic CAM associated with the phases of the master axis of the electronic CAM;
executing, by the processor, a CAM table generating program, to receive an input of a CAM definition variable that defines an electronic CAM operation to be realized through the motion control, and to generate a CAM table in which a CAM curve is arrayed corresponding to the input CAM definition variable; and
storing, by the processor, the generated CAM table into the storage,
wherein one cycle of a task schedule of the motion control includes a fixed-cycle task and a system service, the system service executed in a spare time other than the fixed-cycle task, and
a timing of a calculation process by the CAM table generating program is assigned to the system service.

10. A non-transitory computer-readable recording medium storing a program for controlling a control device configured to execute motion control and sequence control,
the control device including a processor and a storage,
the program causing the processor to perform operations comprising:
executing a CAM computation program to perform, using a CAM table that is an array in which displacements of a slave axis of an electronic CAM are each associated with a phase of a master axis of the electronic CAM, motion control to output position instruction values corresponding to the displacements of the slave axis of the electronic CAM associated with the phases of the master axis of the electronic CAM;
executing a CAM table generating program, to receive an input of a CAM definition variable that defines an electronic CAM operation to be realized through the motion control, and to generate a CAM table in which a CAM curve is arrayed corresponding to the input CAM definition variable; and
storing the generated CAM table into the storage,
wherein one cycle of a task schedule of the motion control includes a fixed-cycle task and a system service, the system service executed in a spare time other than the fixed-cycle task, and
a timing of a calculation process by the CAM table generating program is assigned to the system service.

* * * * *